US010515332B2

(12) United States Patent
Bielefeldt et al.

(10) Patent No.: US 10,515,332 B2
(45) Date of Patent: Dec. 24, 2019

(54) MANAGING A SUPPLY CHAIN

(71) Applicant: Landmark Graphics Corporation, Houston, TX (US)

(72) Inventors: James Alan Bielefeldt, Cypress, TX (US); Dhirendra Diwan, Houston, TX (US); Timothy L. Horvath, Houston, TX (US); John Joseph Vogt, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 326 days.

(21) Appl. No.: 15/510,062

(22) PCT Filed: Oct. 22, 2014

(86) PCT No.: PCT/US2014/061687
§ 371 (c)(1),
(2) Date: Mar. 9, 2017

(87) PCT Pub. No.: WO2016/064381
PCT Pub. Date: Apr. 28, 2016

(65) Prior Publication Data
US 2017/0300851 A1    Oct. 19, 2017

(51) Int. Cl.
*G06Q 10/08*    (2012.01)
*G06Q 30/02*    (2012.01)
(Continued)

(52) U.S. Cl.
CPC ......... *G06Q 10/08* (2013.01); *G06Q 10/0833* (2013.01); *G06Q 10/0875* (2013.01);
(Continued)

(58) Field of Classification Search
CPC ............... G06Q 10/08; G06Q 10/0833; G06Q 10/0875; G06Q 30/02; G06Q 10/00; G06Q 30/00
See application file for complete search history.

(56) References Cited

U.S. PATENT DOCUMENTS 8,050,956 B2 * 11/2011  Abo-Hasna ............ G06Q 10/06
                                                                      705/7.24
2005/0119926 A1 * 6/2005  Turetsky ............ G06Q 10/0831
                                                                      705/331
(Continued)

FOREIGN PATENT DOCUMENTS

JP         2001338165 A       12/2001

OTHER PUBLICATIONS

International Searching Authority, The International Search Report and Written Opinion, International application No. PCT/US2014/061687, which is a PCT parent of the instant application, dated Jun. 30, 2015.

*Primary Examiner* — A. Hunter Wilder
*Assistant Examiner* — Joseph M Mutschler
(74) *Attorney, Agent, or Firm* — Howard L. Speight, PLLC

(57) ABSTRACT

Logistics data includes a plurality of shipments, each including deliveries tied to a purchase order line item (POLI). Each of the deliveries has a delivery quantity and a post goods issue (PGI) date. The logistics data further includes a plurality of logistics services for the plurality of shipments including deliveries tied to the POLI. A multi-mode shipment has a plurality of sequential logistics services. The logistics data includes a plurality of deliveries tied to the POLI, wherein a goods received (GR) quantity and a GR date is determined for each of the deliveries. The processor provides a display of the PGI date and the GR date for the multi-mode shipment. The processor calculates the goods
(Continued)

received (GR) date for a purchase order line item (POLI) based on multiple shipments tied to the POLI and multiple GRs tied to the POLI entered at a field location.

2 Claims, 30 Drawing Sheets

(51) Int. Cl.
    *G06Q 10/00* (2012.01)
    *G06Q 30/00* (2012.01)
(52) U.S. Cl.
    CPC ............ *G06Q 30/02* (2013.01); *G06Q 10/00* (2013.01); *G06Q 30/00* (2013.01)

(56) References Cited

U.S. PATENT DOCUMENTS

| | | | |
|---|---|---|---|
| 2005/0177435 A1* | 8/2005 | Lidow | G06Q 10/06 705/22 |
| 2006/0235739 A1 | 10/2006 | Levis et al. | |
| 2009/0138327 A1 | 5/2009 | Sakuma et al. | |

* cited by examiner

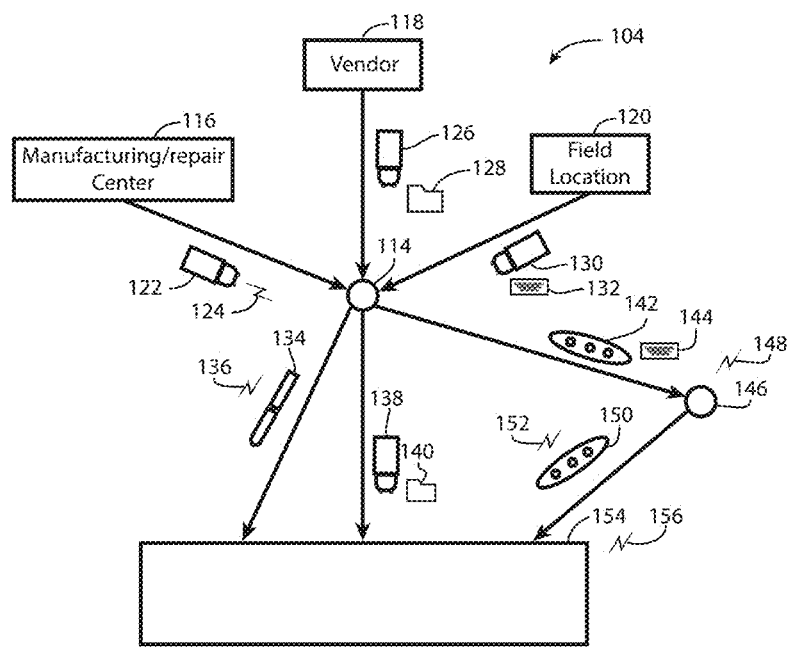
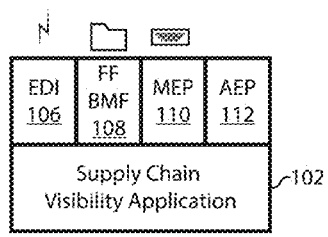
Fig. 1

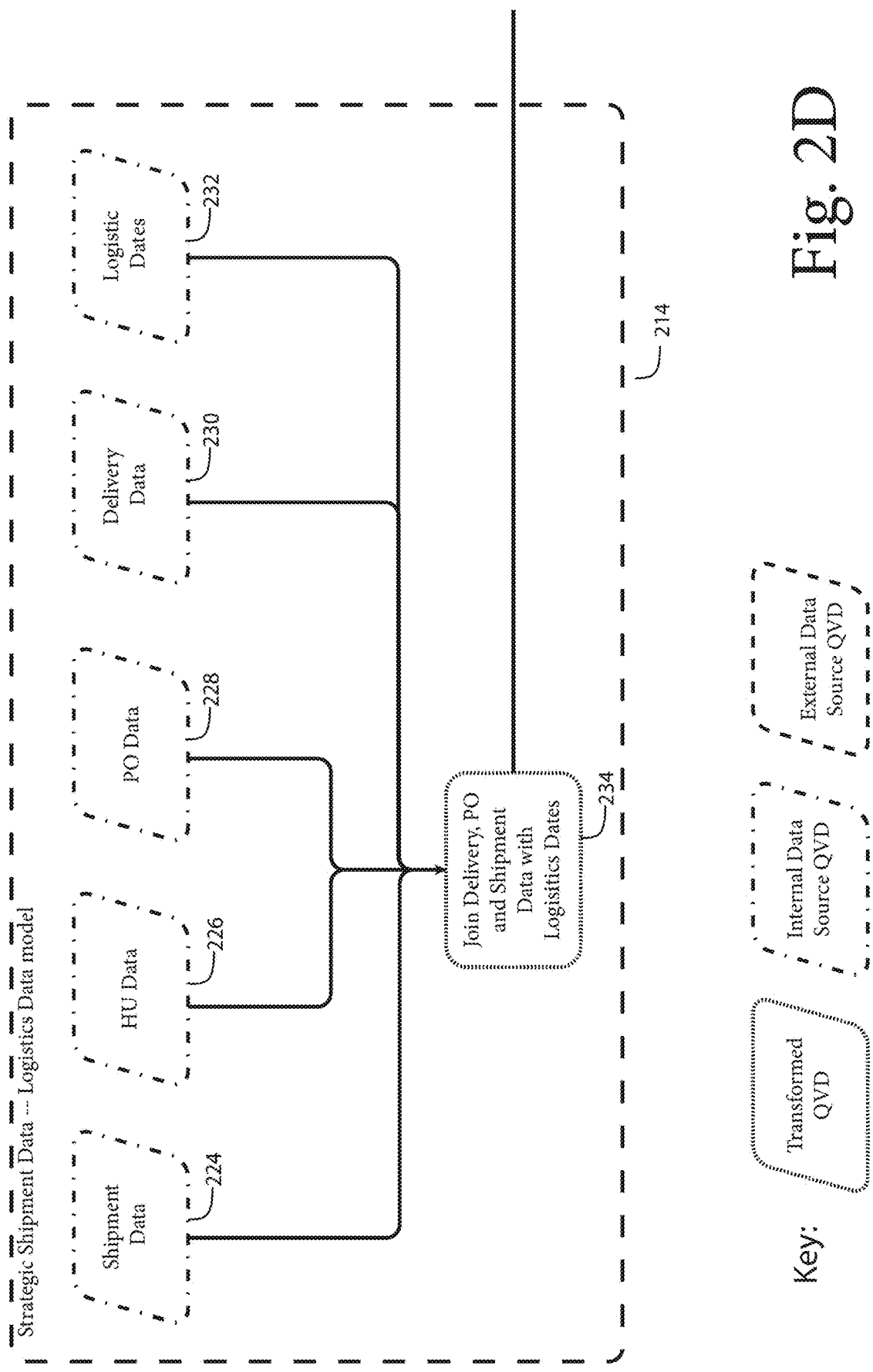

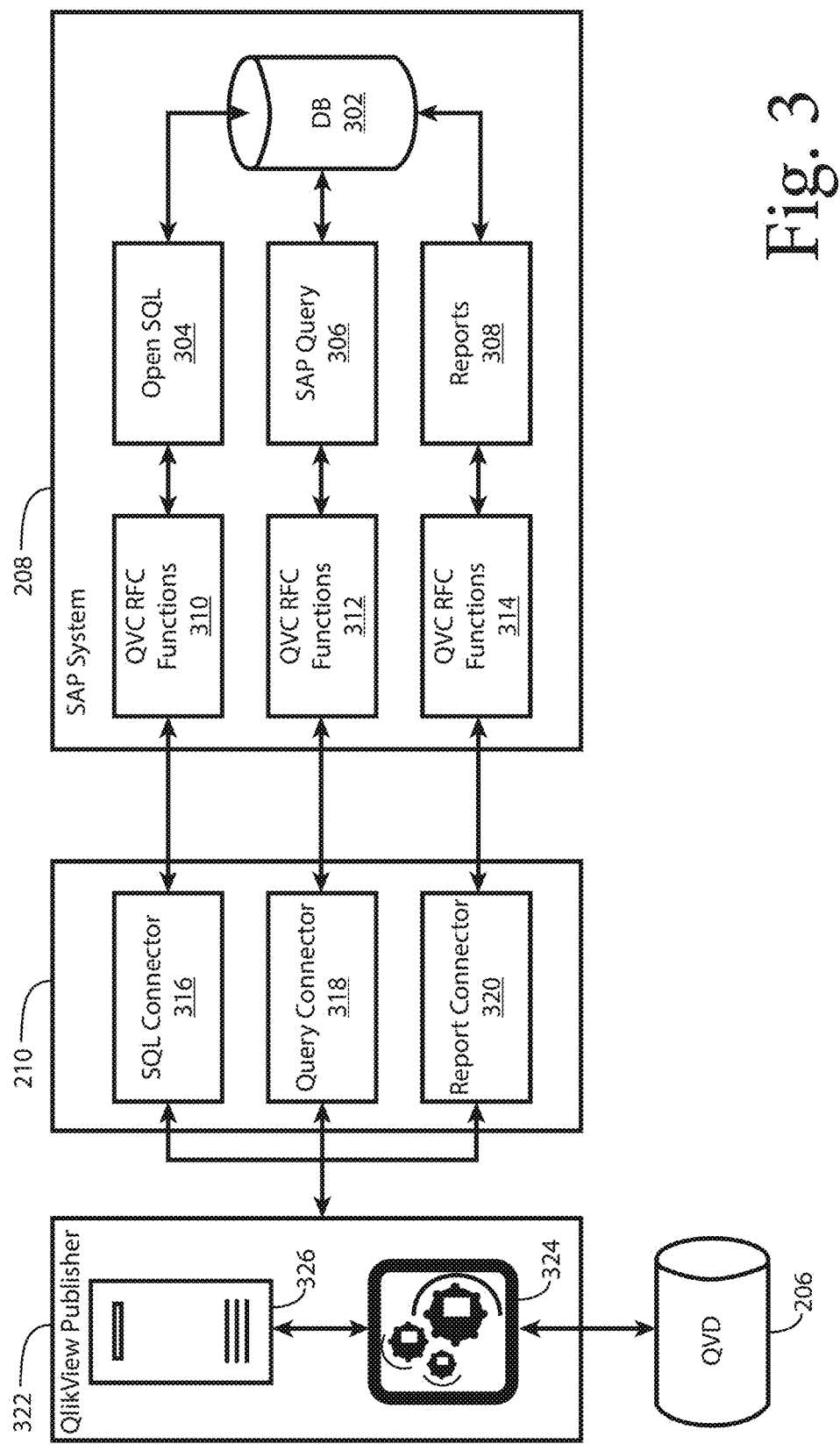

Event Info

Details

| | | | |
|---|---|---|---|
| Order Type | Billing/Invoice # ▽ | Mode | 88 Air Consol ▽ |
| Service Provider | DHL DGF | Country Code | U.A.E. ▽ |
| Billing Number | 99617502 | Event Code | AG - ESTIMATED TIME OF ARRIVAL ▽ |
| Customs Reference Number | 008001320027704 | Event Date | 07/29/2013  (mm/dd/yyyy) |
| House Airway Bill/BOL | 463-03236111 | Port Code | |

New Events List

Edit Selected Event | Remove Selected Event
No Events

Fig. 4

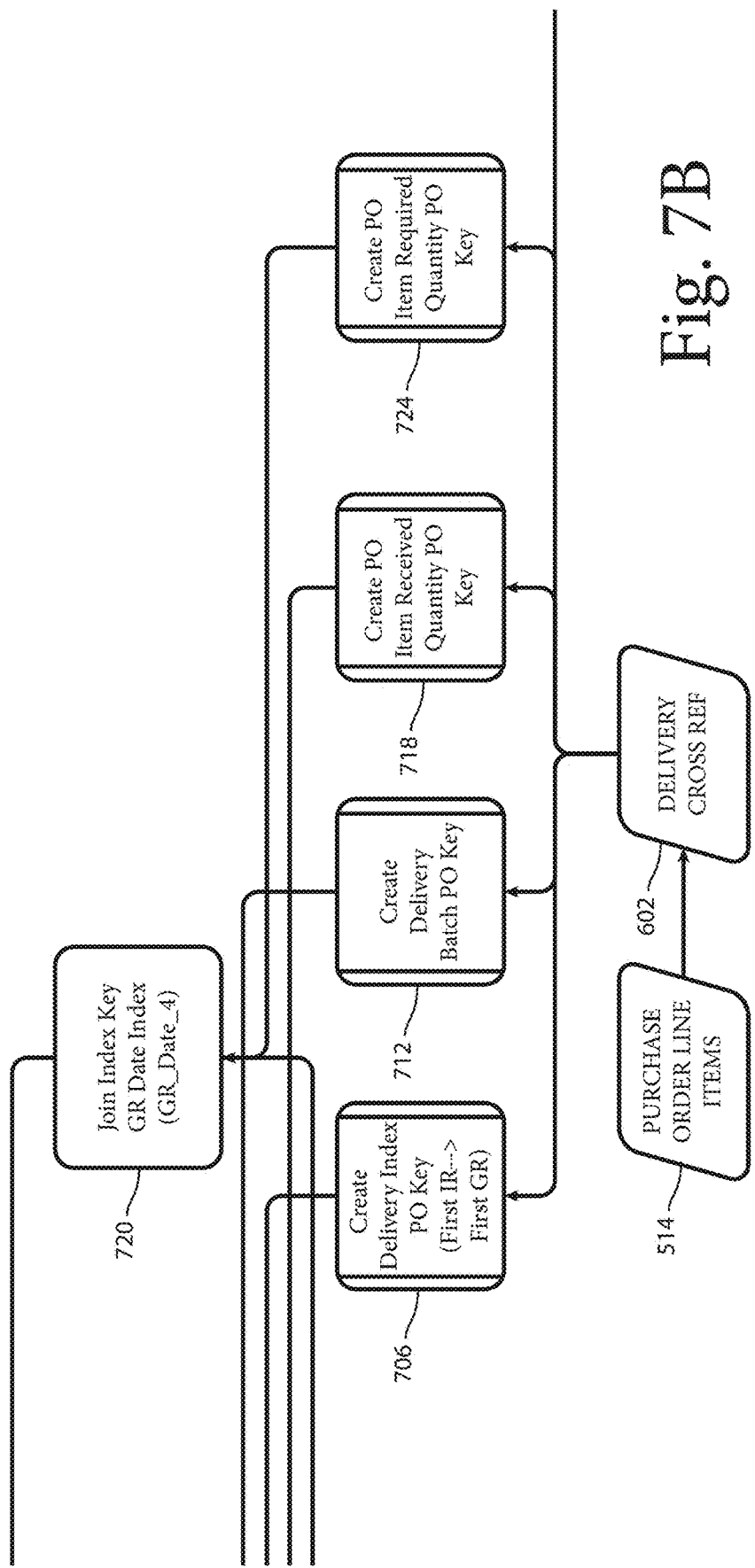

| Origin | | Shipment Information | | GR? |
|---|---|---|---|---|
| Origin Country ▸ | | Mode of Transport ▸ | | ○ No ○ Yes |
| Origin Vendor/Plant ▸ | | Service Level ▸ | | AMI? |
| Destination | | Ordering PSL ▸ | | ○ Yes ○ No |
| Ship to Country ▸ | | Sub PSL ▸ | | Delivery Created? |
| Ship to Party ▸ | | Material PSL ▸ | | ○ Yes ○ No |
| Sold to Party ▸ | | Movement Type | | Capital PO? |
| Sold to Country ▸ | | Origin Type ▸ | | ○ Yes ○ No |
| | | Destination Type ▸ | | |
| Order Information | | Current Selections | | |
| PO Nbr ▸ | | Selected | Values | |
| Sale Order Nbr ▸ | | | | |
| Delivery Nbr ▸ | | | | |
| Billing Doc Nbr ▸ | | | | |
| Material Nbr ▸ | | | | |
| AMI Doc Nbr ▸ | | | | |

? Clear All Selections

🔍 Shipment # ▸

🔍 BOL or Customs Entry # ▸

Historical Data

Fig. 15

ALL ORDERS

| PO # | PO ITEM # | SO # | SO ITEM # | DELIVERY # | DELIVERY ITEM # | BILLING DOC # | AMI DOC # | SHIPMENT # | MATERIAL # |

| MATERIAL DESC. | REQ QTY | DLVRY QTY | CONFIRMED QTY | FIRST CONFIRMED DATE | EXPECTED ONSITE DATE | PGI DATE | DEPARTED SOURCE DATE | ATD DATE | ETA DATE |

| ATA DATE | CUSTOMS DEPART DATE | GR DATE | BILL OF LADING | FREIGHT FORWARDER (BOL) | ORIGIN PLANT/VENDOR | MODE | ORIGIN COUNTRY | SHIP TO PARTY | CUSTOMER NAME |

| DESTINATION COUNTRY | SOLD TO PARTY | ORDERING PSL |

Fig. 16

ALL ORDERS (Logistics Summary)

| DELIVERY # | BILLING DOC # | AMI DOC # | SHIPMENT # | MERGE SHIPMENT NUMBER | FIRST CONFIRMED DATE | EXPECTED ONSITE DATE | PGI DATE | DEPARTED SOURCE PLANT |
|---|---|---|---|---|---|---|---|---|
| ATD DATE | ETA DATE | ATA DATE | CUSTOMS DEPART DATE | BILL OF LADING | FREIGHT FORWARDER (BOL) | MODE | SOURCE | ORIGIN COUNTRY | SHIP TO PARTY |
| SOLD TO PARTY | DESTINATION COUNTRY | | | | | | | |

MANAGING A SUPPLY CHAIN

BACKGROUND

Large enterprises with worldwide operations acquire materials and equipment from sources all over the world and ship to final destinations all over the world. Tracking such materials and equipment from purchase to final use is a challenge.

BRIEF DESCRIPTION OF THE DRAWINGS

FIG. 1 is an illustration of a supply chain.

FIGS. 2D-2H are an illustration of the data flow associated with the Supply Chain Visibility Application.

FIG. 3 is a block diagram of a SAP® connector.

FIG. 4 is a screen shot of a screen used to enter Additional Event Portal data.

FIGS. 7A-7D are data flow diagrams illustrating the processing of goods received data.

FIG. 15 is a screen shot of a search screen.

FIG. 16 shows the column headers for an all orders screen.

FIG. 17 shows the column headers for an all orders (logistics summary) screen.

FIG. 18 is a screen shot of a shipping tracking page.

FIG. 19 is a screen shot of a logistics network statistics tool.

DETAILED DESCRIPTION

Figure 2A:
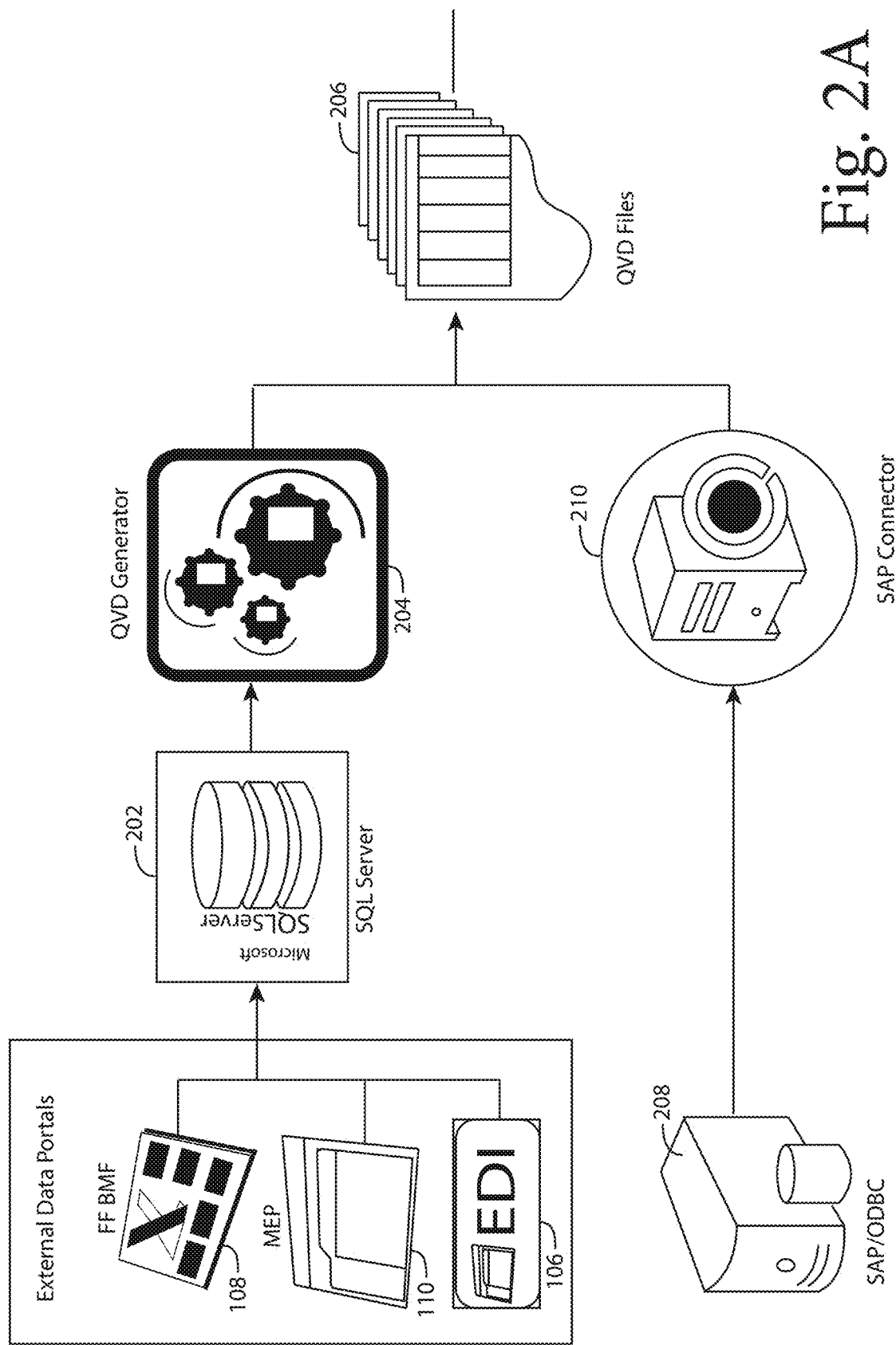
FIGS. 2A-2C are a block diagram of a Supply Chain Visibility Application.

For the purposes of this document, a "delivery" or "outbound delivery" is defined as an SAP® (SAP Aktiengesellschaft Corporation of Dietmar-Hopp-Allee Germany) document that authorizes the release of materials and quantity from inventory. The delivery is then assigned to a shipment (defined below) representing the goods to be delivered together to a goods recipient. The document includes:
material number,
delivery quantity,
location specifications (i.e., goods receiving point, unloading point),
weights and volumes of the individual items.

For purposes of this document, a "post goods issue date" (or "PGI date") is tied to a delivery and is the date when goods are physically moved from a warehouse or plant after a delivery is fully picked. When goods are post goods issued for an outbound delivery, a warehouse stock of the material is reduced by the delivery quantity.

For the purposes of this document, a "shipment" is defined as a transportation of goods from a shipper to a consignee under agreed terms. Transportation planning, picking address, route, shipping cost, etc. are defined in shipment documents. A shipment may be a collection of deliveries having the same route. Deliveries carried under the shipment process or shipping functionality are termed "strategic network." Deliveries which do not have a shipment functionality are termed "non-strategic network."

For the purposes of this document, a "purchase order" (or "PO") is defined as a formal request or instruction from a purchasing organization to a vendor or plant to supply or provide a certain quantity of goods or services at or by a certain point in time. A purchase order consists of a document header and one or more items (or "purchase order line items" (or "POLIs")).

In one or more embodiments, as shown in FIG. 1, a Supply Chain Visibility Application 102 includes a software application that provides international tracking of open orders for materials and equipment through a supply chain, indicated generally by arrow 104, from manufacturing/repair centers, vendor locations, or field locations to delivery and goods receipt (GR) at a final destination. It will be understood that FIG. 1 is an illustrative example that is not intended to limit the scope of the claims.

In one or more embodiments, the Supply Chain Visibility Application 102 includes four portals through which data can be entered:

an Electronic Data Interchange (EDI) interface 106, which is an electronic interface by which data from freight forwarders (i.e., transportation companies that transport freight from one location to another) and customs brokers (i.e., people or entities that facilitate the import or export of goods across political borders) can be entered into the Supply Chain Visibility Application 102, where, in one or more embodiments, it is stored in an SAP® materials management system provided by SAP Aktiengesellschaft Corporation of Dietmar-Hopp-Allee Germany through a Structure Query Language (SQL) interface to a SQL server in SAP®;

a Freight Forwarder and Brokerage Monthly Files (FF BMF) interface 108, by which freight forwarders and customs brokers provide monthly reports with event data that are loaded into the SQL server;

a Manual Events Portal (MEP) interface 110, which is a web based portal that allows freight forwarders and customs brokers to log events;

an Additional Event Portal (AEP) interface 112, which is used by employees of an enterprise 114 to input shipment related information or for field invoice movements not converted to strategic shipments (i.e., non-EDI movements) and to capture event information in a standard format.

In one or more embodiments, as shown in FIG. 1, the supply chain includes an enterprise 114, which coordinates the supply chain activities. In one or more embodiments, the enterprise 114 acquires materials or equipment from one or more manufacturing/repair centers 116, one or more vendors 118, and/or one or more field locations 120, to fulfill a POLI. In one or more embodiments, the purchase order that includes the POLI includes other purchase order line items.

In one or more embodiments, the one or more manufacturing/repair centers 116 respond with one or more shipments by one or more trucks operated by one or more freight forwarders 122. It will be understood that each of the freight forwarders described herein could operate by air, by water, by rail, by truck, or by charter or by a combination of those transportation modes. In one or more embodiments, the one or more freight forwarders 122 communicate with the Supply Chain Visibility Application via EDI, as indicated by lightning bolt 124 (which corresponds to the lightning bolt above the EDI in FIG. 1).

In one or more embodiments, the one or more vendors 118 respond with one or more shipments by one or more different modes (air/ocean/rail/land) operated by one or more freight forwarder 126. In one or more embodiments, the one or more freight forwarders 126 provide monthly reports with event data that are loaded into the Supply Chain Visibility Application through the SQL server, as indicated by the file folder symbol 128 (which corresponds to the file folder symbol above the FF BMF in FIG. 1).

In one or more embodiments, the field locations 120 respond with one or more shipments by one or more different modes (air/ocean/rail/land) operated by one or more freight forwarders 130. In one or more embodiments, the one or more freight forwarders 130 submit events to the Supply Chain Visibility Application through the MEP, as indicated by the keyboard symbol (which corresponds to the keyboard symbol above the MEP in FIG. 1).

In one or more embodiments, the enterprise 114 receives the shipments from the one or more manufacturing/repair centers 116, the one or more vendors 118, and/or the one or more field locations 120.

In one or more embodiments, the enterprise 114 divides the received shipments into multiple consolidated shipments.

In one or more embodiments, the enterprise 114 ships one of the multiple shipments by one or more different modes (air/ocean/rail/land) operated by one or more freight forwarders 134, which record events with the Supply Chain Visibility Application by EDI, as indicated by lightning bolt 136.

In one or more embodiments, the enterprise 114 ships one of the multiple shipments by one or more different modes (air/ocean/rail/land) operated by one or more freight forwarders 138, which record events with the Supply Chain Visibility Application by FF BMF, as indicated by the file folder symbol 140.

In one or more embodiments, the enterprise 114 ships one of the multiple shipments by one or more different modes (air/ocean/rail/land) operated by one or more freight forwarders 142, which record events with the Supply Chain Visibility Application by MEP, as indicated by the keyboard symbol 144. In one or more embodiments, the freight forwarder 142 ships its shipment to a port agent 146 at a port. In one or more embodiments, the port agent records events with the Supply Chain Visibility Application by EDI, as indicated by lightning bolt 148. In one or more embodiments, the port agent 146 ships the shipment by one or more different modes (air/ocean/rail/land) operated by one or more freight forwarders 150, which record events with the Supply Chain Visibility Application by EDI, as indicated by lightning bolt 152.

In one or more embodiments, the shipments shipped by the freight forwarder 134, the shipments shipped by the freight forwarder 138, and the shipments shipped by the freight forwarder 150 arrive at the final destination 154. In one or more embodiments, the final destination 154 records events with the Supply Chain Visibility Application by EDI, as indicated by lightning bolt 156.

In one or more embodiments, the shipments forwarded by the freight forwarder 134 are stored at the final destination 154. In one or more embodiments, the shipments forwarded by the freight forwarder 138 are stored at the final destination 154. In one or more embodiments, the shipments forwarded by freight forwarder 152 are stored at the final destination 154

In one or more embodiments, the final destination 154 pulls materials and uses them in quantities that may not match the quantities in the shipments, as discussed in detail below in connection with FIGS. 7A-7D and scenarios 1-5.

In one or more embodiments, the shipments from the enterprise 114 do not all ship on the same day. In one or more embodiments, the dates the shipments are delivered to the final destination 154 are not all the same. In one or more embodiments, some but not all of the delivery dates are the same.

In one or more embodiments, the various freight forwarders 122, 126, 130, 134, 138, 142, and 152, and the port agent 146 enter the following information into the Supply Chain Visibility Application for each shipment:

ETD date—the estimated date the shipment will ship out of the origin country,

ATD date—the actual date the shipment shipped out of the origin country,

ETA date—the estimated date the shipment will arrive at the final destination country, ATA date—the actual date the shipment arrived at the final destination country.

In one or more embodiments, a shipment may go through an intermediate country (i.e., a cross dock) (e.g., the port served by the port agent 146) on the way to the final destination country. For example, in one or more embodiments, a shipment may go from Malaysia through Singapore on the way to Saudi Arabia. In one or more embodiments, even after arriving in the final destination country, a shipment may be processed by the final destination country's customs bureaucracy and may not be released from customs as a whole but may be separated into smaller parcels.

As can be seen, the single POLI may have multiple shipments through freight forwarders 134, 138, 142, and 152 and multiple delivery dates. It will be understood that the number of shipments, the number of freight forwarders, and the number of delivery dates may be fewer or greater than that shown in FIG. 1. It will be further understood that FIG. 1 is just an example of a supply chain. Many variations of the example shown are envisioned.

Figure 2B:
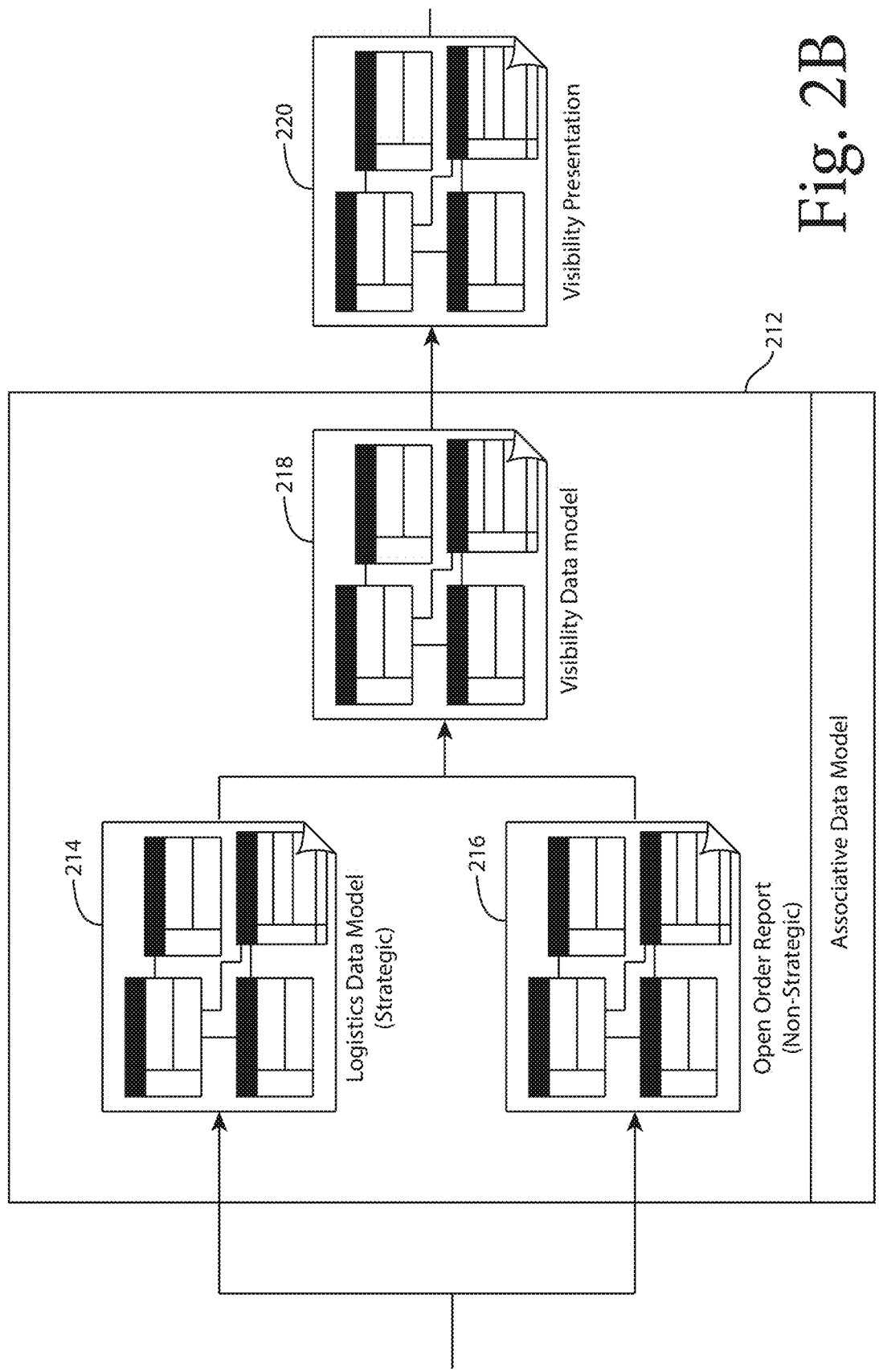
Figure 2C:
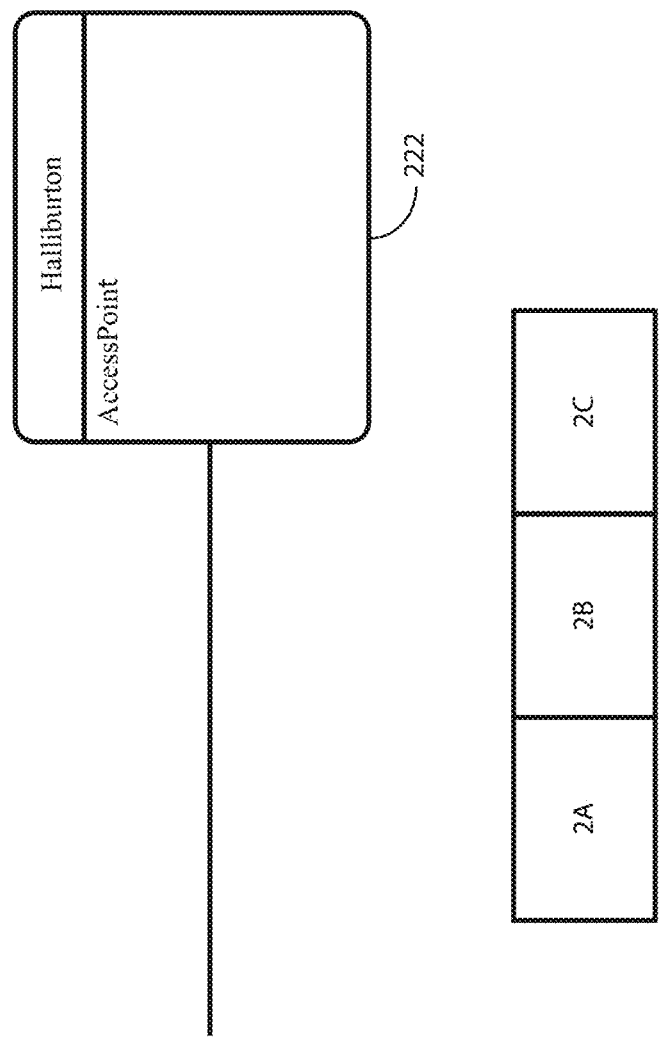
Figure 2E:
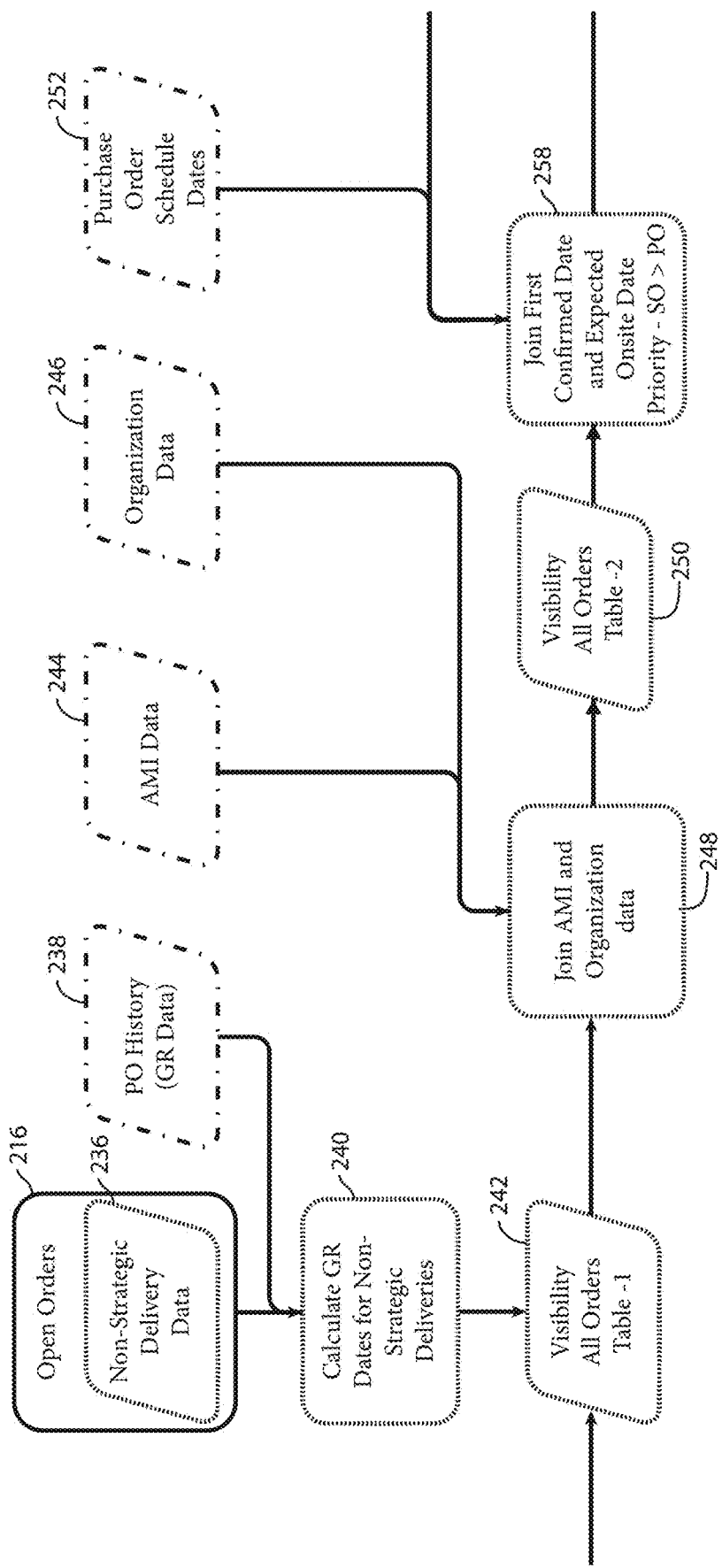
Figure 2F:
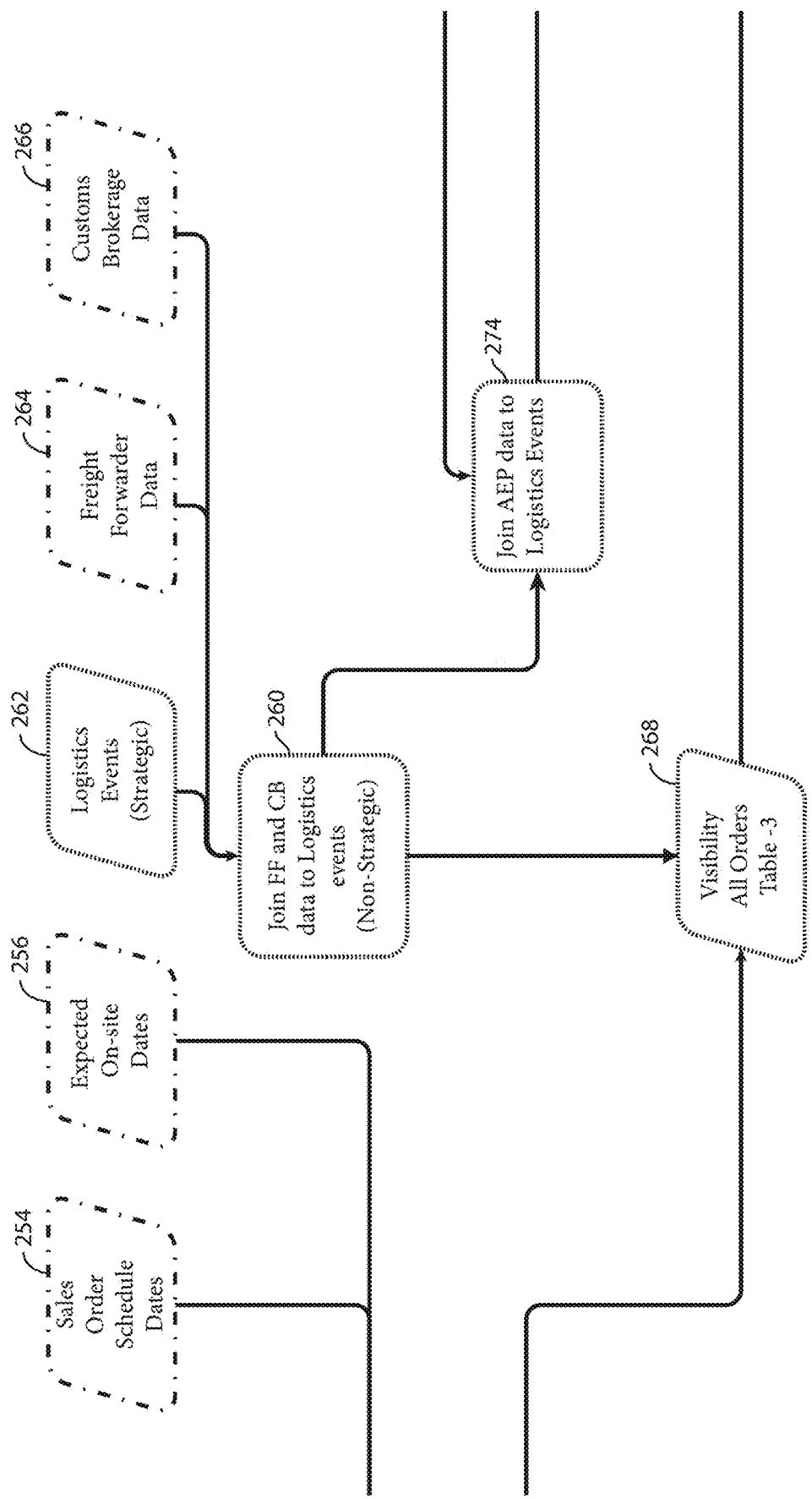
Figure 2G:
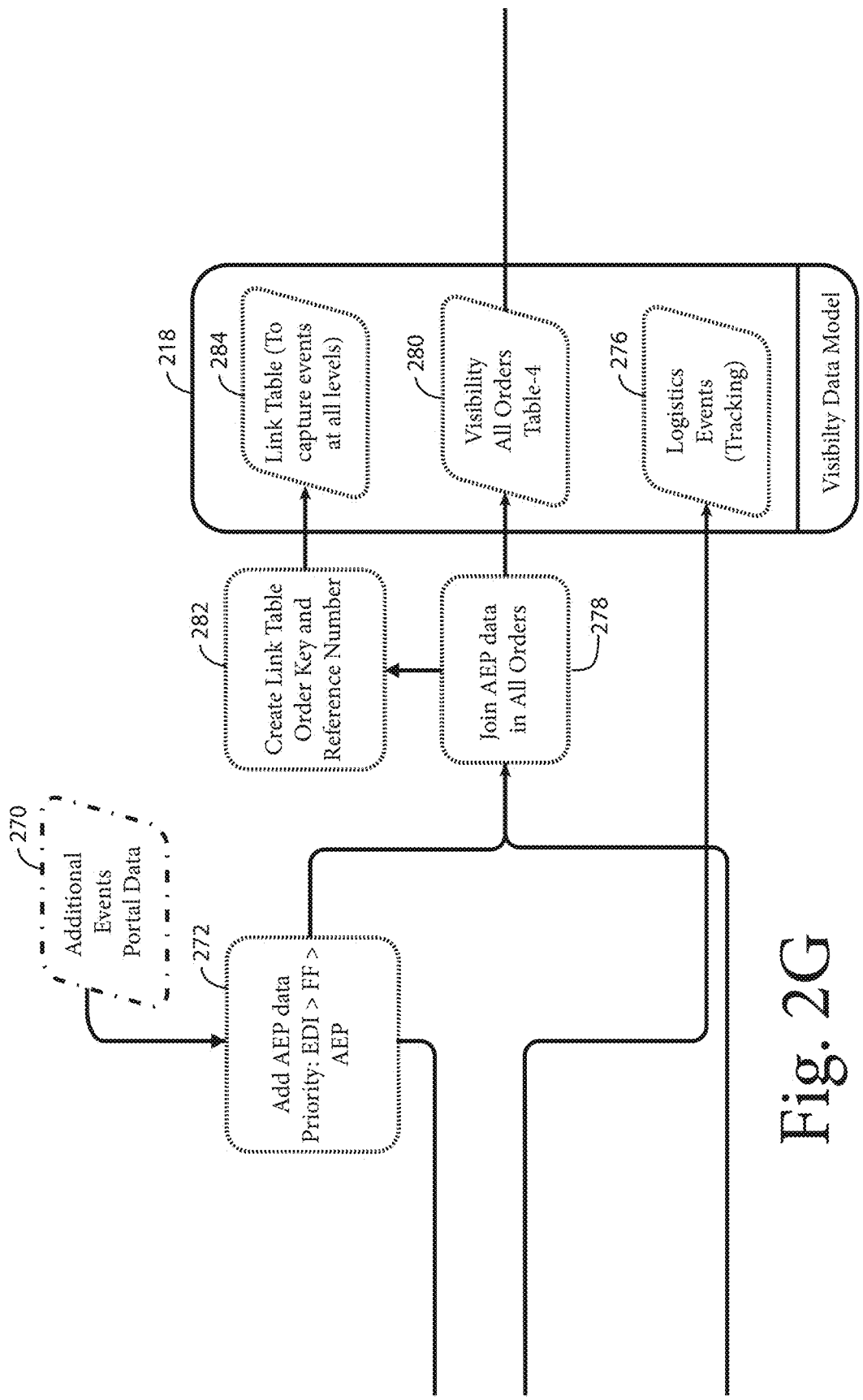
Figure 2H:
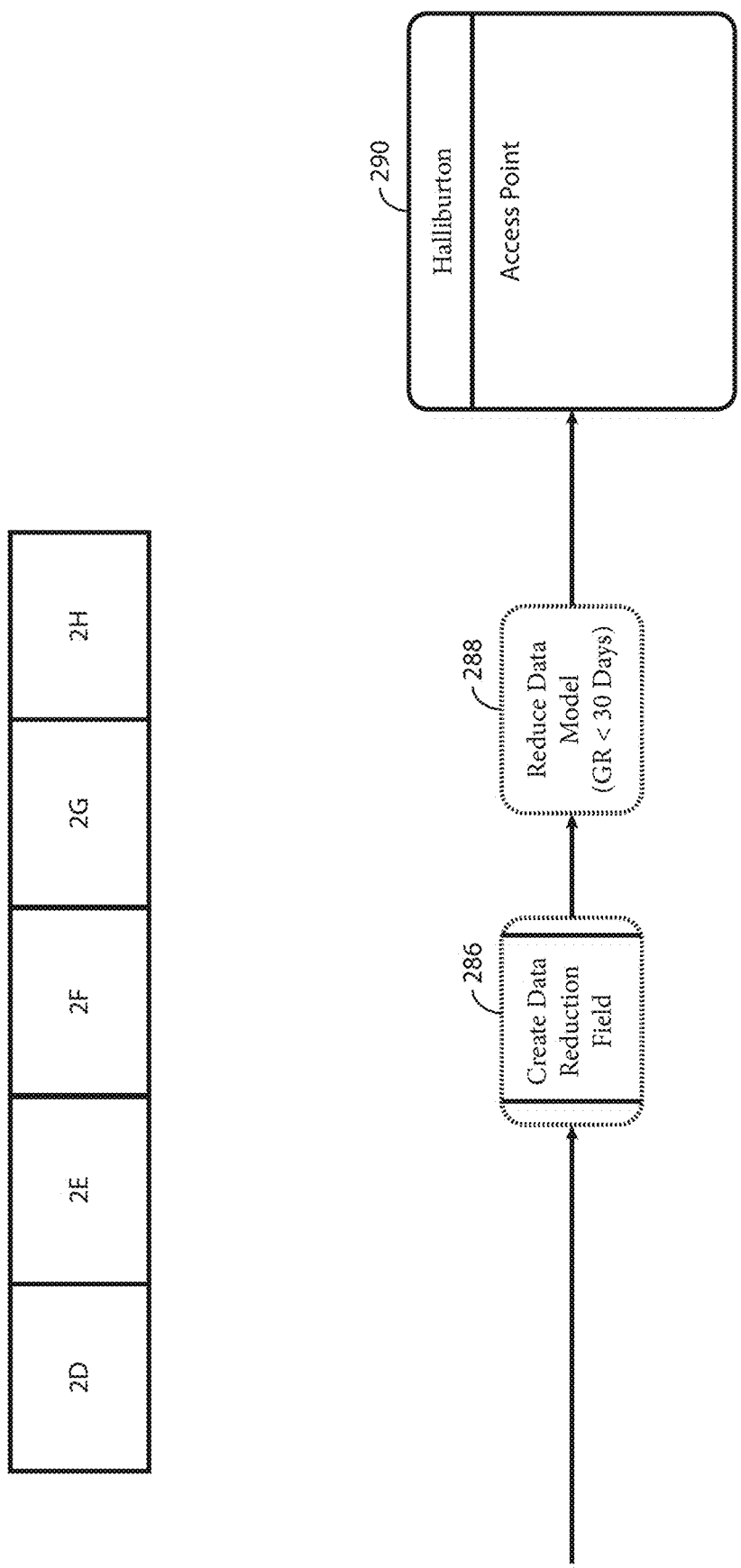

In one or more embodiments, illustrated in FIGS. 2A, 2B, and 2C (which are arranged as shown in the key on FIG. 2C), events entered through EDI 106, FFBMF 108, and MEP 110 are entered into a SQL server 202 (EDI 106 and MEP 110 entries pass through SAP® before entering SQL server 202), such as Microsoft SQL Server. In one or more embodiments, data is transferred from the SQL server 202 to an associate data model 212 built on a QLIKVIEW® platform provided by QlikTech International AB Corporation of Schleelevagen Sweden. In one or more embodiments, a QLIKVIEW® data (QVD) generator 204 generates QVD files 206 from the SQL server 202. In one or more embodiments, the QVD files 206 are data for the associative data model 212.

In one or more embodiments, other data, such as data submitted through EDI 106 and MEP 110, is stored in a SAP® system 208 provided by SAP Aktiengesellschaft Corporation of Dietmar-Hopp-Allee Germany.

In one or more embodiments, an SAP® connector 210, developed by QLIKVIEW® allows downloads from the SAP® system into the QVD files. This is illustrated in more detail in FIG. 3. In one or more embodiments, the SAP® system 208 includes a database (DB) 302 that is accessed by an Open SQL module 304, a SAP® Query module 306, and a Reports module 308. In one or more embodiments, each of these modules is accessible by the SAP® connector 210 through respective QVC remote function call (RFC) functions 301, 312, 314. In one or more embodiments, the SAP® connector 210 includes a SQL connector 316 that accesses the functionality of the Open SQL module 304. In one or more embodiments, the SAP® connector 210 includes a query connector 318 that accesses the functionality of the SAP Query module 206. In one or more embodiments, the SAP® connector 210 includes a report connector 320 that accesses the functionality of the reports module 308. In one or more embodiments, a QLIKVIEW® publisher 322 runs software 324 on a computer system 326 to produce the QVD files 206.

In one or more embodiments, the associative data model 212 (see FIG. 2B) includes a logistics data model 214 for strategic data, which stores data from cross-docks, freight forwarders, customs brokers, consolidated lanes, and proprietary software (e.g., AEP 112). In one or more embodiments, the associate data model 212 includes an open order report 216 for non-strategic data, which stores reports from any field location to another field location or from a vendor to a location which is not strategic. In one or more embodiments, a visibility data model 218 provides a portal through which data from the logistics data model 214 and the open order report 216 can be presented through a visibility presentation 220 on a display 222.

In one or more embodiments of the data flow associated with the Supply Chain Visibility Application, illustrated in FIGS. 2D-2H (which are arranged as shown in the key on FIG. 2H), the logistics data model 214 includes the shipment data 224, the handling unit (HU) data 226, the PO data 228, the delivery data 230, and the logistics data 232. In one or more embodiments, data from the logistics data model 214 is joined (block 234). In one or more embodiments, the open orders table 216, which includes nonstrategic delivery data 236, is used along with the PO history file 238, which contains GR data, to calculate GR dates for nonstrategic deliveries 240. The data from block 234 and the calculated GR dates from block 240 are combined to create a visibility all orders table-1 242. AMI data 244 (i.e., internal materials management data) and organization data 246 are joined with the visibility all order table-2 (block 248) to create the visibility all orders table-2 250. That data is joined with purchase order schedule dates 252, sales order schedule dates 254, and expected on-site dates 256 (block 258). That data is joined with joined 260 logistics events (strategic) 262, freight forwarder data 264, and customs brokerage data 266 to produce visibility all orders table-3 268. Additional Events Portal Data 270 is joined 272, 274 with the logistics events data to produce a logistics event (tracking) table 276 within the visibility data model 218. The Additional Events Portal Data 270 is joined 272, 278 to the visibility all orders table-3 268 to produce the visibility all orders table-4. That data is used to create 282 a link table with an order key and reference number 284. A data reduction field is created for the visibility all orders table-4 280 (block 286) and a reduce model (with GR<30 days) is created (block 288), which is available for query and display at an access point 290.

As mentioned above, the Additional Event Portal (AEP) 112 provides the ability to insert data into the SQL database, through a screen such as that shown in FIG. 4, where it is validated against the SAP® system 208.

The data sources, entities, location, transformation performed, and destination QVD files are described in Table 1 below:

TABLE 1

| Type | Data Source | Entity | Location | Transformation Performed | QVD |
|---|---|---|---|---|---|
| External | Excel | Freight Forwarder (38 Field report) | SQL Server | Stored Procedure SQL - Add SAP reference data to freight forwarder data | FFLOGData |
| | Excel | Customs Brokerage Files (26 Field report) | SQL Server | Stored Procedure SQL - Add SAP reference data to Customs Brokerage data | Customs Brokerage |
| | SAP | EDI- Customs Brokerage Data | SQL Server | Generate Handling Unit Key | Shipment Events |
| | SAP | Manual Events Portal Data-Forwarder | Manual Events Portal/SQL Server | Generate Handling Unit Key | |
| | SAP | EDI- Freight Forwarder Data | SQL Server | Generate Handling Unit Key | |
| Internal | Portal | Additional Events Portal (AEP) Data | WebPortal/SQL Server | Convert all reference numbers to Delivery Key | Additional Events |
| | SAP | Purchase Order Header | SAP Connector QVD | Generate Purchase order Item Key | Logistics Purchase Order Header |
| | SAP | Purchase Order Items | SAP Connector QVD | Generate Purchase order Item Key | Logistics Purchase Order Items |
| | SAP | Sales Orders | SAP Connector QVD | Generate Sales order Item Key | Sales Orders |
| | SAP | Sales Order Items | SAP Connector QVD | Generate Sales order Item Key | Sales Order Items |
| | SAP | Sales Document Flow | SAP Connector QVD | Generate Sales order Item Key and Delivery Key | Sales Document Flow |
| | SAP | Sales Document Partner | SAP Connector QVD | Create Mapping loads | Sales Document Partner |
| | SAP | Delivery | SAP Connector QVD | Generate Delivery Key | Delivery |
| | SAP | Delivery Items | SAP Connector QVD | Generate Delivery Key | Delivery Items |

TABLE 1-continued

| Type | Data Source | Entity | Location | Transformation Performed | QVD |
|---|---|---|---|---|---|
| | SAP | Delivery Cross ref | SQL Server | Generate Delivery Key | Logistics Delivery Cross ref |
| | SAP | Shipment | SQL Server | Map Service level and Transportation Group Description | Logistics Shipment |
| | SAP | Shipment Stages | SQL Server | Create Mapping loads | Logistics Shipment Stage |
| | SAP | Route | SAP Connector QVD | Create Mapping loads | Logistics Route |
| | SAP | Billing Documents | SQL Server | Generate Billing doc Item Key | Billing Documents |
| | SAP | Handling Unit | SQL Server | Generate Handing Unit Key | Logistics Handling Unit |
| | SAP | Handling Unit Items | SQL Server | Generate Handing Unit Key, Create mapping load | Logistics Handling Unit Items |
| | SAP | Assets (AMI data) | SQL Server | Generate AMI and Delivery Key | ZAAUR |
| | SAP | Material Master | SAP Connector QVD | Create Mapping loads | Materials |
| | SAP | Equipment Materials Master | SQL Server | Create Mapping loads | Equipment Master |
| | SAP | Plant Materials | SQL Server | Create Mapping loads | Plant Materials |
| | SAP | Organization PSL | SQL Server | Create Mapping loads | Organization |
| | SAP | Plant | SQL Server | Create Mapping loads | Plant |
| | SAP | Customer | SQL Server | Create Mapping loads | Customer |
| | SAP | Purchase Order Schedule Dates | SAP Connector QVD | Generate Purchase order Item Key | Purchase Order Schedule Dates |
| | SAP | Sales Order Schedule Dates | SAP Connector QVD | Generate Sales order Item Key | Sales Order Schedule Dates |
| | SAP | Sales Order Line Item Dates | SAP Connector QVD | Generate Sales order Item Key | Sales Order Line Item Dates |
| | SAP | Purchase Order History | SAP Connector QVD | Generate Purchase order Item Key | Purchase Order History |

The logistics data model 214 maps loads where there is a one-to-one relationship between fields as shown in Table 2 below:

TABLE 2

| Mapping name | Table | Input Field | Mapped Field |
|---|---|---|---|
| Sales Order Profit Center Map | Sales Order Items Qvd | Sales Order Item | Profit Center |
| Country Name Map | Country. Qvd | Country Code | Country Name |
| Country Map | Country. Qvd | Country OID | Country code |
| Customer Country Map | Customer. Qvd | Customer Number | Country code |
| Event Map | Event Description. Qvd | Event ID | Event Description |
| Delivery priority Service Level Map | Delivery Priority (Inline Table) | Delivery priority | Service Level |
| Plant City Map | Plant. Qvd | Plant Number | Plant City |
| Plant Country Map | Plant. Qvd | Plant Number | Plant Country |
| Plant Name Map | Plant. Qvd | Plant Number | Plant Name |
| Plant type Map | Plant. Qvd | Plant Number | Plant Type |

In one or more embodiments, the logistics data model 214 is built on the framework of the associative data model 212 using strategic shipment data from SAP®. Data is stored in transformed tables in a QVD format to be used by the visibility data model 218.

Figure 5:
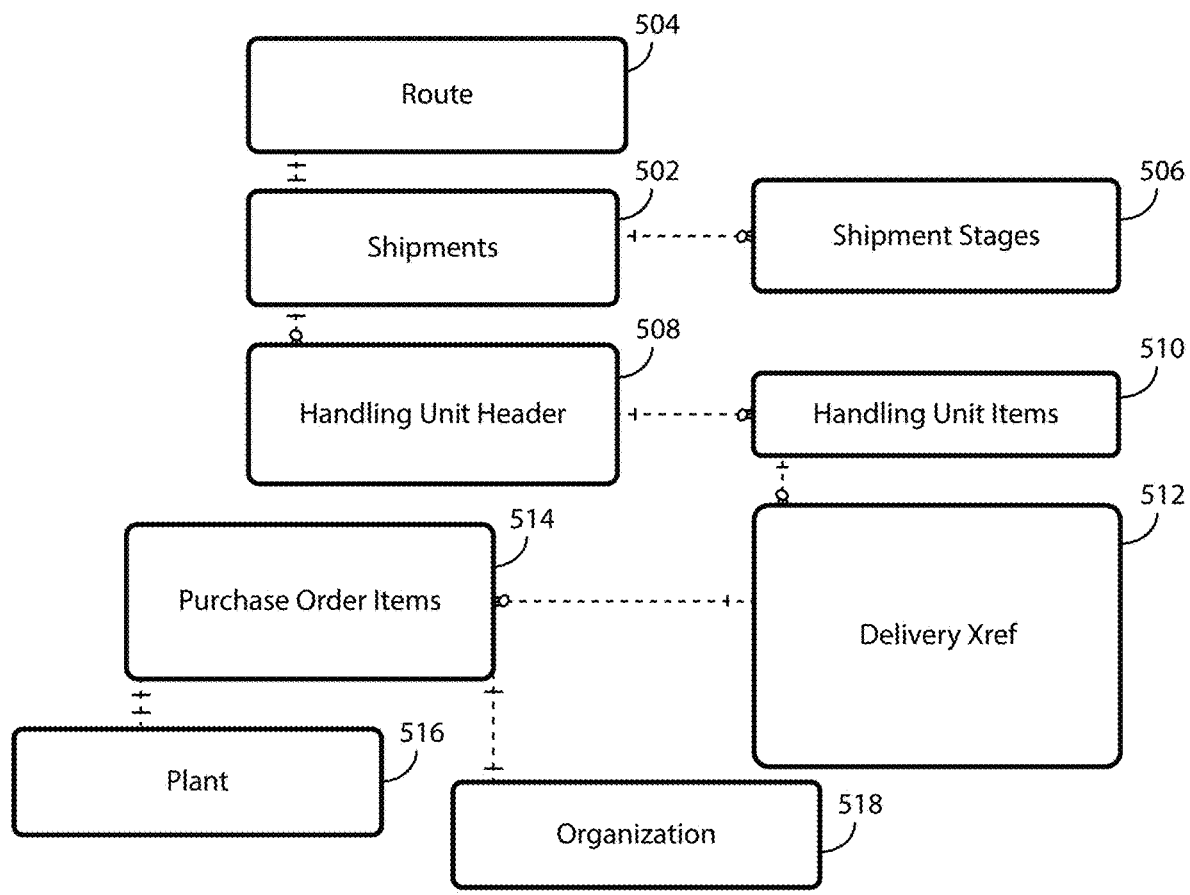
FIGS. 5, 6, and 8-13 are relationship diagrams showing relationships between files in the Supply Chain Visibility Application.

FIG. 5 and the other relationship diagrams described herein (FIGS. 6 and 8-13) use "crow foot" symbology. Each of the boxes with rounded corners represents a QVD table. A line between two tables indicates a relationship between the tables. A single stroke at each end of the line indicates a one-to-one relationship. A single stroke at one end of the line and a crow foot at the other indicates a one-to-many relationship, with the crow foot indicating the "many" side of the relationship. An open circle with a crow foot at one end of a line indicates zero or more.

In one or more embodiments of the associative data model 212, illustrated in FIG. 5, the shipments table 502 has a one-to-one relationship with the route table 504. In one or more embodiments, the shipments table 502 includes a Shipment Number field (primary key), a Route field, and a Shipment Mode field.

In one or more embodiments, the shipments table 502 has a one-to-zero-or-more relationship with a shipment stages table 506. In one or more embodiments, the shipment stages table 506 includes a Shipments Shipment Number field (foreign key), a Shipment Stage field, and a Shipment Freight Forwarder Number field.

In one or more embodiments, the shipments table 502 has a one-to-zero-or-more relationship with a handling unit header table 508. In one or more embodiments, the handling unit header table 508 has an External Handling Unit Identifier (primary key) field, a Shipment Number field, a Handling Unit Number field, and a Shipments Shipment Number field (foreign key).

In one or more embodiments, the handling unit header table 508 has a one-to-zero or more relationship with a handling line items table 510. In one or more embodiments, the handling line items table 510 includes a Handling Unit Number field (foreign key) and a Delivery Key field.

In one or more embodiments, the handling unit line items table 510 has a one-to-zero or more relationship with a delivery cross-reference table 512. In one or more embodiments, the delivery cross-reference table 512 includes a Delivery Key field (foreign key), a Purchase Order Item Key field (primary key), a Delivery Number field, an Origin Country field, a Destination Country field, an Origin Plant field, a Destination Plant field, a Billing Doc Number field, and a Sales Order Number field.

In one or more embodiments, the delivery cross-reference table 512 has a one-to-zero-or-more relationship with a purchase order items table 514. In one or more embodiments, the purchase order items table 514 include a Purchase Order Item Key field (primary key), a Purchase Order Number field, a Purchase Order Line Item Number field, a Profit Center field, and a Plant field.

In one or more embodiments, the purchase order items table 514 has a one-to-one relationship with the plant table 516. In one or more embodiments, the plant table 516 includes a Plant field (foreign key), a Plant Name field and a Plant Country field.

In one or more embodiments, the purchase order items table 514 has a one-to-one relationship with the organization table 518. In one or more embodiments, the organization table 518 includes a Profit Center field (primary key), a PSL Name field (where "PSL" is an abbreviation for product service line), and a SUB PSL field.

Figure 6:
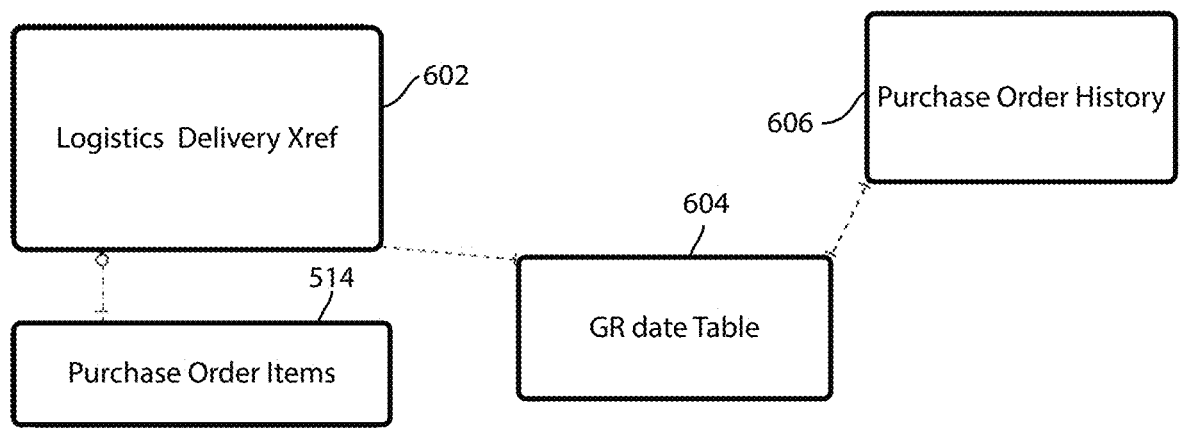
Figure 7A:
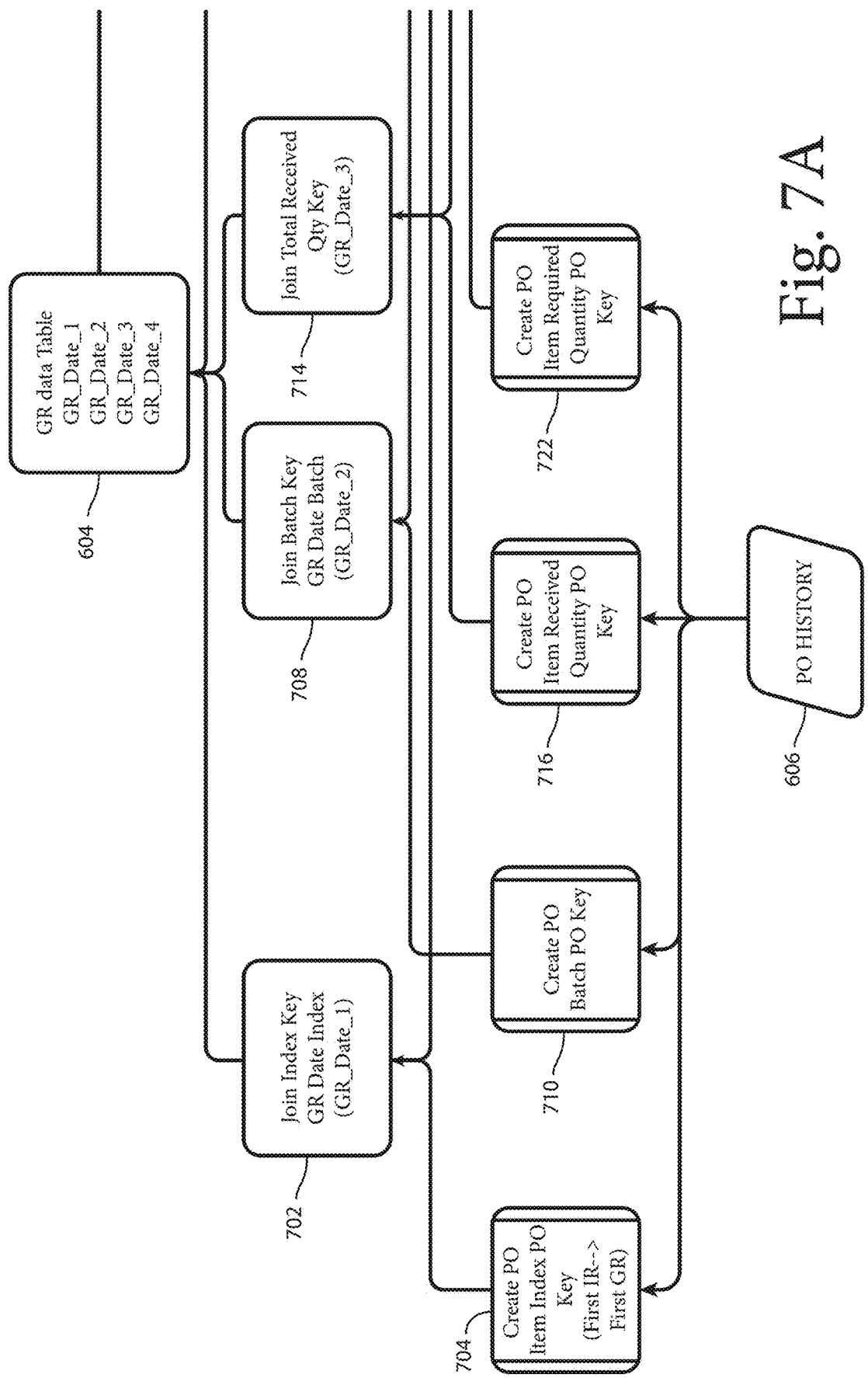
Figure 7C:
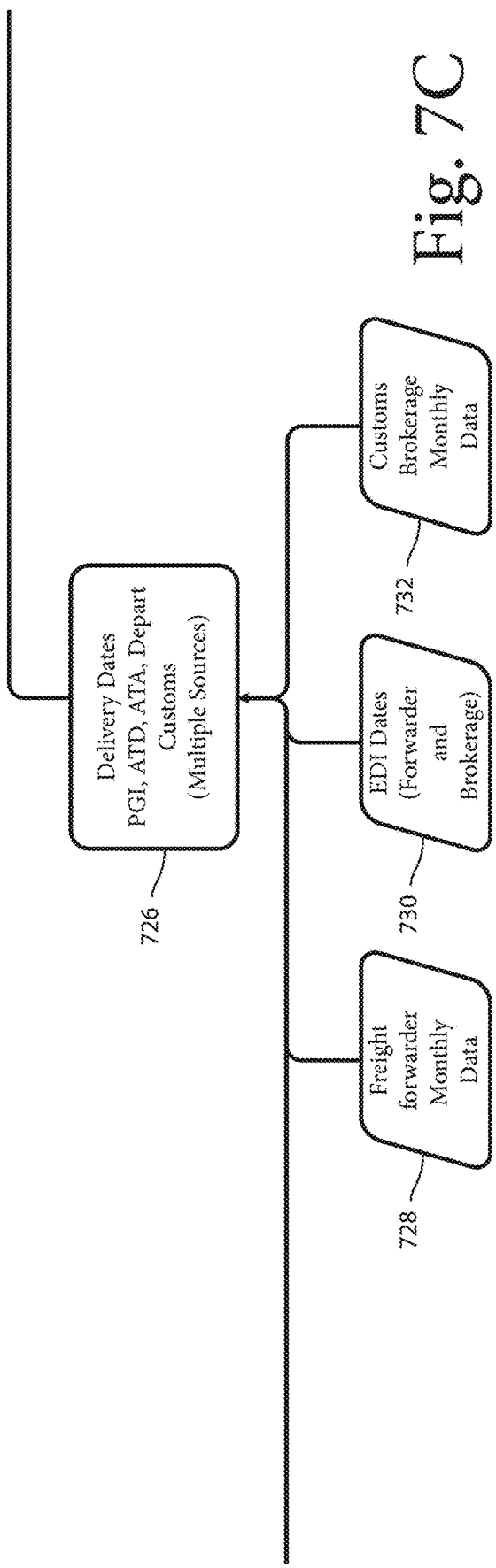
Figure 7D:
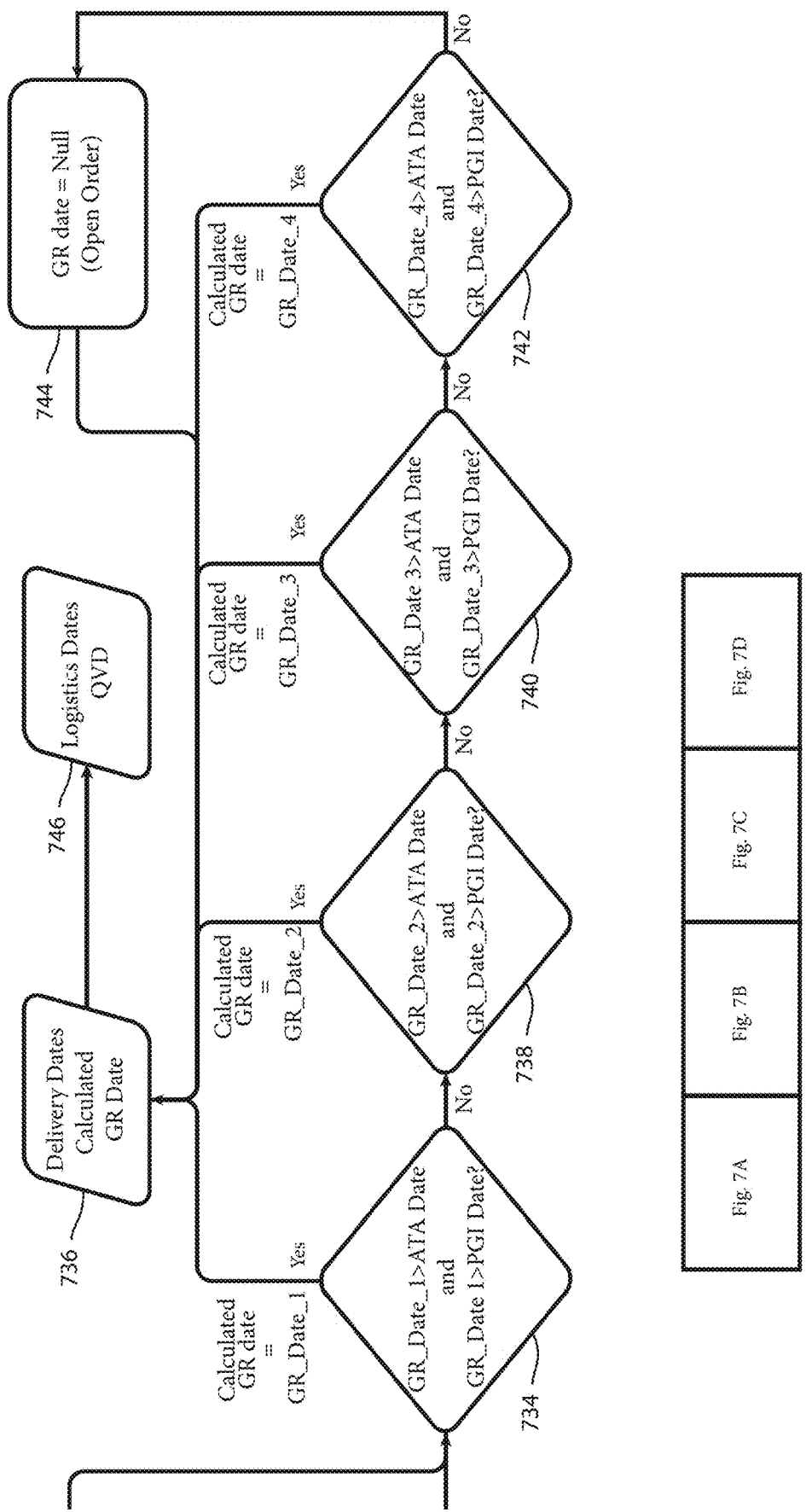

In one or more embodiments, illustrated in FIG. 6, the purchase order items table 514 (shown also in FIG. 5) has a one-to-zero or more relationship with a logistics delivery cross-reference table 602. In one or more embodiments, the logistics delivery cross-reference table 602 includes a Delivery Key field (foreign key), a Purchase Order Item Key (foreign key), a Delivery Quantity field, a Purchase Order Item Index Key field, a Purchase Order Batch PO Key field, a Purchase Order Total Received Quantity Key field, a Purchase Order Total Required Item Quantity Key field, and a Purchase Order Items Purchase Order Item Key.

In one or more embodiments, the logistics delivery cross-reference table 602 has a one to one relationship with a GR date table 604. In one or more embodiments, the GR date table 604 includes a Delivery Key field (foreign key), a GR Date 1 field, and GR Date 2 field, and GR Date 3 field, and a GR Date 4 field.

In one or more embodiments, the GR date table 604 has a one-to-one relationship with a purchase order history table 606. In one or more embodiments, the purchase order history table 606 includes a Purchase Order Item Key field, a Purchase Order Item Index Key field, a Purchase Order Batch PO Key field, a Purchase Order Total Received Quantity Key field, a Purchase Order Total Required Quantity Key field, and a GR Date field.

In one or more embodiments, the GR date table 604 holds the results of the application of GR rules designed to capture the GR date from a POLI in SAP® and associate it to a delivery line item on a shipment. In one or more embodiments, the GR date table 604 contains four GR date arrays (GR_Date_1, GR_Date_2, GR_Date_3, and GR_Date_4) (it will be understood that additional GR date arrays are possible and are within the scope of the claims appended hereto) which are used to make the correlation between GR date and delivery line item, and that are used in subsequent analysis, described below, to determine whether a POLI should be closed, meaning that all shipments comprising deliveries tied to the POLI have been GRed.

In one or more embodiments, each of the GR date arrays addresses a different scenario that occurs in the shipment of goods. In each of these scenarios, in one or more embodiments:

multiple shipments are comprised of deliveries tied to a POLI, each of the multiple deliveries has post goods issue (PGI) date (i.e., the date that the goods tied to the shipment were physically moved from a warehouse or plant), the PGI dates have an order (e.g., a date order and/or a time order)

multiple deliveries are tied to the POLI, each of the multiple deliveries tied to the POLI has a delivery quantity;

each of the deliveries has a delivery item with a delivery item quantity as discussed below in connection with scenario 3;

each of the multiple deliveries tied to the POLI may have multiple GR events (i.e., it is possible for goods from a single delivery to be GRed in more than one batch), each of the multiple GR events has a GR quantity and a GR date, the GR dates have an order (e.g., a date order and/or a time order), the POLI has a required quantity (i.e., the amount ordered under the POLI.

In one or more embodiments, the GR_Date_1 array addresses the scenario in which the GR quantities match the delivery quantities but the order of the GR quantities is different from the order of the delivery quantities. For example, assume the following scenario (all of this data is tied to a single POLI):

| | | Scenario 1 | | | |
|---|---|---|---|---|---|
| Shipment | Delivery Quantity | PGI Date | GR Event | GR Quantity | GR Date |
| 1 | 40 | 1 Jun. 2014 | 1 | 60 | 1 Jul. 2014 |
| 2 | 60 | 3 Jun. 2014 | 2 | 40 | 3 Jul. 2014 |

In this scenario, shipment 1, with a delivery quantity of 40, has a PGI date of 1 Jun. 2014, and shipment 2, with a delivery quantity of 60, has a PGI date of 3 Jun. 2014. GR event 1, with a GR quantity of 60, has a GR date of 1 Jul. 2014, and GR event 2, with a GR quantity of 40, has a GR date of 3 Jul. 2014. Shipment 1 and shipment 2 were not split into multiple deliveries; that is, the delivery quantities and the GR quantities match (i.e., the delivery quantity for shipment 1 matches the GR quantity for GR event 2 and the delivery quantity for shipment 2 matches the GR quantity for GR event 1). As a result, in this scenario, establishing a GR date for a shipment also establishes a GR date for a delivery. Shipment 1 has been GRed after shipment 2 even though it shipped first, which could happen because of delays in shipment, delays in customs, or a variety of other reasons. In one or more embodiments, this is confirmed by comparing the GR date with the ATA date.

In one or more embodiments, the GR_Date_1 array handles this situation. In one or more embodiments, a processor calculates the GR_Date_1 array by:

- matching the delivery quantities of the multiple shipments tied to the POLI to the GR quantities of the multiple GR events tied to the POLI (i.e., matching shipment 1 to GR event 2 and shipment 2 to GR event 1), and
- for each shipment, saving the delivery quantity, PGI date for the delivery quantity, GR quantity, and GR date for each match in the GR_Date_1 array.

In one or more embodiments, the result is a GR_Date_1 array that includes the following data:

| GR_Date_1 array for Scenario 1 | | | | |
|---|---|---|---|---|
| Shipment | Delivery quantity | PGI Date | GR Quantity | GR Date |
| 1 | 40 | 1 Jun. 2014 | 40 | 3 Jul. 2014 |
| 2 | 60 | 3 Jun. 2014 | 60 | 1 Jul. 2014 |

In one or more embodiments, the GR_Date_1 array also handles the situation in which multiple shipments tied to the same POLI have the same delivery quantities, as shown in scenario 2:

| Scenario 2 | | | | | |
|---|---|---|---|---|---|
| Shipment | Delivery Quantity | PGI Date | GR Event | GR Quantity | GR Date |
| 1 | 20 | 1 Jun. 2014 | 1 | 60 | 1 Jul. 2014 |
| 2 | 60 | 3 Jun. 2014 | 2 | 20 | 3 Jul. 2014 |
| 3 | 20 | 5 Jun. 2014 | 3 | 20 | 5 Jul. 2014 |

The matches in scenario 2 are more difficult than the matches in scenario 1 because shipments 1 and 3 have the same quantities as do GR events 2 and 3. In one or more embodiments, a processor calculates the GR_Date_1 array by:

- matching the delivery quantities of the multiple shipments tied to the POLI to the GR quantities of the multiple GR events tied to the POLI (i.e., matching shipment 1 to GR event 2 and shipment 2 to GR event 1),
- where the matching is ambiguous because at least some of the delivery quantities tied to the POLI are equal (i.e., the delivery quantities for shipment 1 and shipment 3 are equal) and at least some of the GR quantities tied to the POLI are equal (i.e., the GR quantities for GR events 2 and 3 are equal) (the ambiguity is whether shipment 1 should be linked to GR event 2 or GR event 3 and whether shipment 3 should be linked to GR event 2 or GR event 3),
- resolving the ambiguity by giving preference to aligning the order of the PGI dates to the order of GR dates, and
- for each shipment, saving the delivery quantity, PGI date for the delivery quantity, GR quantity, and GR date for each match in the GR_Date_1 array.

As with scenario 1, in one or more embodiments, establishing a GR date for a delivery also establishes a GR date for a shipment.

In one or more embodiments, the result is a GR_Date_1 array that includes the following data:

| GR_Date_1 array for Scenario 2 | | | | |
|---|---|---|---|---|
| Shipment | Delivery quantity | PGI Date | GR Quantity | GR Date |
| 1 | 20 | 1 Jun. 2014 | 20 | 3 Jul. 2014 |
| 2 | 60 | 3 Jun. 2014 | 60 | 1 Jul. 2014 |
| 3 | 20 | 5 Jun. 2014 | 20 | 5 Jul. 2014 |

In one or more embodiments, deliveries are split into multiple delivery items, such as shown in scenario 3 below:

| Scenario 3 | | | |
|---|---|---|---|
| Shipment | Delivery Quantity | PGI Date | Delivery Item Quantity |
| 1 | 20 | 1 Jun. 2014 | 10 |
| 1 | 20 | 1 Jun. 2014 | 10 |
| 2 | 60 | 3 Jun. 2014 | 60 |
| 3 | 20 | 5 Jun. 2014 | 20 |

| GR Event | GR Quantity | GR Date |
|---|---|---|
| 1 | 60 | 1 Jul. 2014 |
| 2 | 20 | 3 Jul. 2014 |
| 3 | 20 | 5 Jul. 2014 |

In one or more embodiments, the GR_Date_2 array handles this situation. In one or more embodiments, a processor calculates the GR_Date_2 array by:

- summing the delivery item quantities of deliveries tied to the same shipment (i.e. summing the delivery item quantities for the deliveries tied to shipment 1),
- matching the summed delivery item quantities to the GR quantities (i.e., shipment 1 with summed to delivery item quantities matches GR event 2 and shipment 3 matches GR event 3), and
- for each shipment, saving the delivery quantity, PGI date for the delivery quantity, GR quantity, and GR date in the GR_Date_2 array;

The result is a GR_Date_2 array that includes the data shown below:

| GR_Date_2 array for Scenario 3 | | | | | |
|---|---|---|---|---|---|
| Shipment | Delivery quantity | PGI Date | Delivery Item Quantity | GR Quantity | GR Date |
| 1 | 20 | 1 Jun. 2014 | 10 | 20 | 3 Jul. 2014 |
| 1 | 20 | 1 Jun. 2014 | 10 | 20 | 3 Jul. 2014 |
| 2 | 60 | 3 Jun. 2014 | 60 | 60 | 1 Jul. 2014 |
| 3 | 20 | 5 Jun. 2014 | 20 | 20 | 5 Jul. 2014 |

In one or more embodiments the GR quantities do not match the delivery quantities as shown in scenario 4 below:

| Scenario 4 | | | | | |
|---|---|---|---|---|---|
| Shipment | PGI Date | Delivery Quantity | GR Event | GR Quantity | GR Date |
| 1 | 1 Jun. 2014 | 20 | 1 | 10 | 1 Jul. 2014 |
| 2 | 3 Jun. 2014 | 60 | 2 | 10 | 3 Jul. 2014 |
| 3 | 5 Jun. 2014 | 20 | 3 | 60 | 5 Jul. 2014 |
| | | | 4 | 20 | 7 Jul. 2014 |

In one or more embodiments, the GR_Date_3 array handles this situation. In one or more embodiments, a processor calculates the GR_Date_3 array by:
- summing the GR quantities of a group of GR events so that the sum matches a delivery quantity of one of the multiple deliveries (e.g., summing the GR quantities of GR events 1 and 2 and matching that sum (20) to the delivery quantity of the delivery of shipment 1),
- determining a maximum of the GR dates from the group of GR events and saving it as a maximum_GR_date_3 (3 Jul. 2014, which is the maximum of 1 Jul. 2014 and 3 Jul. 2014),
- changing the GR dates of the GR events in the group to the maximum_GR_date_3, and
- for each shipment, saving the delivery quantity, PGI date for the delivery quantity, summed GR quantity, and changed GR date in the GR_Date_3 array.

The result is a GR_Date_3 array that includes the data shown below (note that shipment 1 has the GR date of the latest of the group of GR events that were summed to match the delivery quantity of shipment 1):

| GR_Date_3 array for Scenario 4 | | | | |
|---|---|---|---|---|
| Shipment | PGI Date | Delivery Quantity | GR Quantity | GR Date |
| 1 | 1 Jun. 2014 | 20 | 20 | 3 Jul. 2014 |
| 2 | 3 Jun. 2014 | 60 | 60 | 5 Jul. 2014 |
| 3 | 5 Jun. 2014 | 20 | 20 | 7 Jul. 2014 |

In one or more embodiments, the delivery quantities do not match the GR quantities, as shown in scenario 5 below:

| Scenario 5 | | | | | |
|---|---|---|---|---|---|
| Shipment | PGI Date | Delivery Quantity | GR Event | GR Quantity | GR Date |
| 1 | 1 Jun. 2014 | 20 | 1 | 85 | 1 Jul. 2014 |
| 2 | 3 Jun. 2014 | 60 | 2 | 5 | 3 Jul. 2014 |
| 3 | 5 Jun. 2014 | 20 | 3 | 10 | 5 Jul. 2014 |

In one or more embodiments, the GR_Date_4 array handles this situation. In one or more embodiments, a processor calculates the GR_Date_4 array by:
- summing the GR quantities of the multiple GR events to produce summed_GR_quantities (i.e., in scenario 4, the sum of the GR quantities is 10+10+60+20=100);
- determining that the summed_GR_quantities equals the required quantity for the POLI (assume the required quantity is 100);
- determining a maximum of the GR dates from the multiple GR events and saving it as maximum_GR_date_4 (the maximum GR date is 5 Jul. 2014),
- changing the GR dates of the multiple GR events to the maximum_GR_date_4;
- for each shipment, saving the delivery quantity, PGI date for the delivery quantity, GR quantity, and changed GR date in the GR_Date_4 array.

The result is a GR_Date_4 array that includes the data shown below (note that all shipments have the GR date of the latest of the GR events in the scenario):

| GR_Date_4 array for Scenario 5 | | | | |
|---|---|---|---|---|
| Shipment | PGI Date | Delivery Quantity | GR Quantity | GR Date |
| 1 | 1 Jun. 2014 | 20 | 85 | 5 Jul. 2014 |
| 2 | 3 Jun. 2014 | 60 | 5 | 5 Jul. 2014 |
| 3 | 5 Jun. 2014 | 20 | 10 | 5 Jul. 2014 |

In one or more embodiments, the GR date table 604 is created as shown below:

```
GR_Date_Table:

Load Distinct
    PO_ITM_QTY_INDEX_KEY
    ,PO_Key
    ,PO_BATCH_QTY_REC_INDEX_KEY
    ,[Dlvry_Cross_Ref Delivery Quantity]
    ,PO_TOTAL_QTY_REC_KEY
    ,PO_ITM_REQ_QTY_KEY
    ,[Delivery Key]
    ,Date([DLVRY Actual Goods Movement Date], 'MM/DD/YYYY')
        as PGI_Date
resident Delivery_Xref;
    left join (GR_date_Table)
    load
        PO_ITM_QTY_INDEX_KEY
        ,[POH Posting Date] as GR_Date_1
    resident PO_HIST;
    left join (GR_date_Table)
    load
        PO_BATCH_QTY_REC_INDEX_KEY
        ,[POH Posting Date] as GR_Date_2
    resident PO_HIST;
    left Join(GR_date_Table)
    LOAD
        PO_HIST_PO_KEY as PO_Key,
        PO_TOTAL_QTY_REC_KEY,
            max([POH Posting Date]) as GR_Date_3
            PO_HIST_PO_KEY&'_'&Sum([POH Receipt
            Quantity]) as
    PO_TOTAL_QTY_REC_KEY
    Resident PO_HIST
    Where Exists(PO_HIST_PO_KEY)
    Group by PO_HIST_PO_KEY;
    left Join(GR_date_Table)
    LOAD
        PO_HIST_PO_KEY as PO_Key,
            PO_HIST_PO_KEY &'_'&Sum([POH Receipt
            Quantity]) as
    PO_ITM_REQ_QTY_KEY,
            max([POH Posting Date]) as GR_Date_4
        Resident PO_HIST
    Where Exists(PO_HIST_PO_KEY)
    Group by PO_HIST_PO_KEY;
```

In one or more embodiments, as further illustrated in FIGS. 7A-7D (which are viewed as shown in the key on FIG. 7D), the GR data Table 604 is formed from:
- a GR_Date_1 702 which is formed by joining:
  - an Item Index Key 704, which is created from the PO History QVD file 606, with a Delivery Index PO Key 706, which is created from the Delivery Cross Reference QVD file 602, which is in turn created from a Purchase Order Line Items QVD file 514;

a GR_Date_2 708 which is formed by joining:
  a Batch PO Key 710, which is created from the PO History QVD file 606, with
  a Delivery Batch PO Key 712, which is created from the Delivery Cross Reference QVD file 602;

a GR_Date_3 714 which is formed by joining:
  an Item Received Quantity PO Key 716, which is created from the PO History QVD file 606, with
  an Item Received Quantity PO Key 718, which is created from the Delivery Cross Reference QVD file 602;

a GR_Date_4 720 which is formed by joining:
  an Item Required Quantity PO Key 722, which is created from the PO History QVD file 606, with
  an Item Required Quantity PO Key 727, which is created from the Delivery Cross Reference QVD file 602.

In one or more embodiments, the GR data Table 604 is compared to a Delivery Dates table 726, which is created from QVD files containing freight forwarder monthly data 728, EDI dates (forwarder and brokerage) 730, and customs brokerage monthly data 732, to determine the calculated GR date for each delivery and to determine if the POLI should be closed based on those deliveries, as follows:

If GR_Date_1>ATA date and GR_Date_1>PGI date (block 734) then the calculated GR date for the delivery (block 736) is set to GR_Date_1 ("yes" branch from block 734), otherwise ("no" branch from block 734):

If GR_Date_2>ATA date and GR_Date_2>PGI date (block 738) then calculated GR date for the delivery (block 736) is set to GR_Date_2 ("yes" branch from block 738), otherwise ("no" branch from block 738):

If GR_Date_3>ATA date and GR_Date_3>PGI date (block 740) then the calculated GR date for the delivery (block 736) is set to GR_Date_3 ("yes" branch from block 740), otherwise ("no" branch from block 740):

If GR_Date_4>ATA date and GR_Date_4>PGI date (block 742) then the calculated GR date for the delivery (block 736) is set to GR_Date_4 ("yes" branch from block 742), otherwise ("no" branch from block 742):

the GR date for the delivery is set to "null" (block 744), indicating that the POLI is still open.

The resulting data is stored in the Logistics Dates QVD file 746.

In one or more embodiments, the GR date arrays have a hierarchy. In one or more embodiments, the hierarchy order is as follows: GR_Date_1 array, GR_Date_2 array, GR_Date_3 array, and GR_Date_4 array. That is, in one or more embodiments:

if the GR_Date_1 array can be calculated it will take precedence over the others, if the GR_Date_1 array cannot be calculated by the GR_Date_2 array can be calculated, the GR_Date_2 array will take precedence over the others, if the GR_Date_1 array and the GR_Date_2 array cannot be calculated but the GR_Date_3 array can, the GR_Date_3 array will take precedence over the others, and the GR_Date_4 array will only be used if it can be calculated and none of the other arrays can be calculated.

Figure 8:
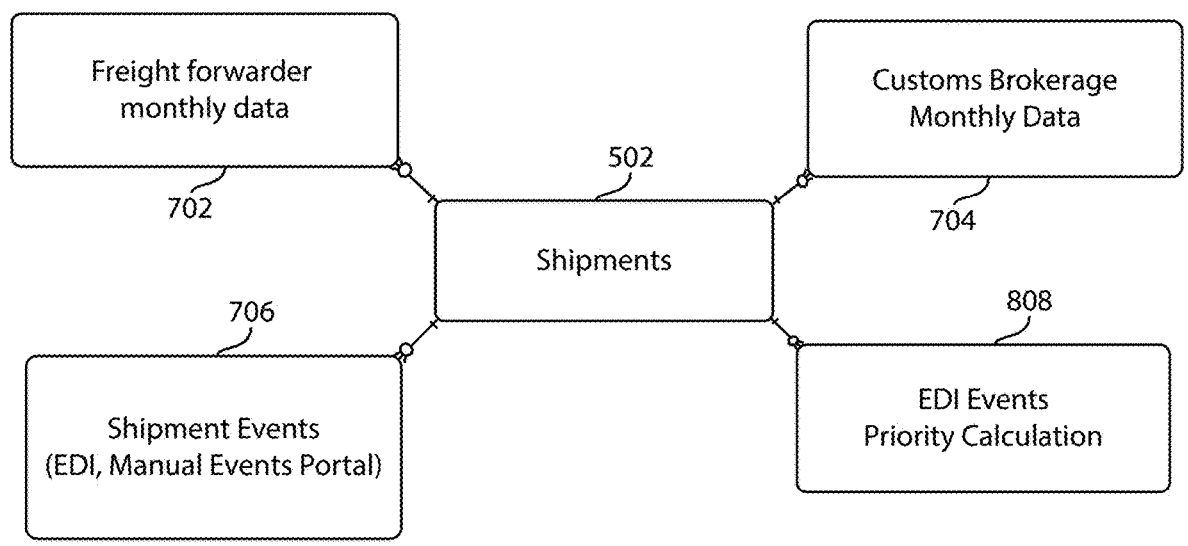

In one or more embodiments, illustrated in FIG. 8, the logistics data model 214 calculates the most recent submission of bill of lading or house airway bill number and associates the freight forwarder and customs broker monthly reports data along with EDI data to the strategic shipment data at the handling unit level. In one or more embodiments, the resulting QVD files are saved to be used by the visibility tool (discussed below) and other reporting tools. In one or more embodiments, the shipments table 502 (also shown in FIG. 5) has a one-to-zero or more relationship with a freight forwarder monthly data table 702 (described above in connection with FIG. 7).

In one or more embodiments, the shipments table 502 has a one-to-zero or more relationship with a customs brokerage monthly data table 704 (described above in connection with FIG. 7).

In one or more embodiments, the shipments table 502 has a one-to-zero or more relationship with a shipment events table 706 (described above in connection with FIG. 7).

In one or more embodiments, the shipments table 502 has a one-to-zero or more relationship with an EDI events priority calculation table 808. In one or more embodiments, the EDI events priority calculation table 808 includes an External Handling Unit Identifier field (foreign key), a Minimum ATD Date field, a Maximum ATA Date field, a BOL field, and a Maximum Customs Depart Date field.

Figure 9:
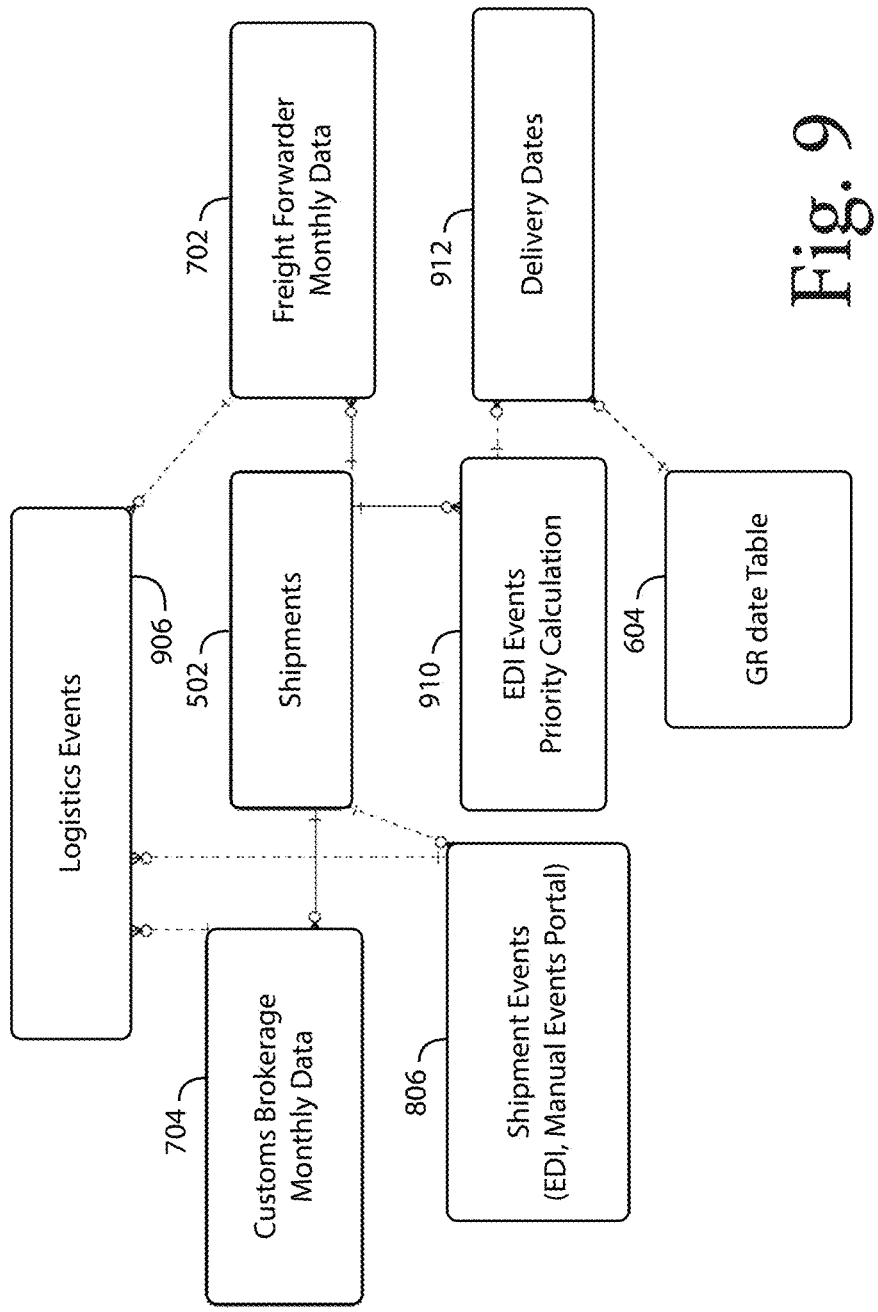

In one or more embodiments, illustrated in FIG. 9, the logistics data model 214 consolidates all internal (i.e., within SAP®) and external events, which will provide tracking at the handling unit level. In one or more embodiments, this data can be extrapolated to deliveries, shipments, purchase orders, sales orders, material numbers, etc. In one or more embodiments, a summary of critical events with origin and final destination country check is calculated to provide a quick summary of events. In one or more embodiments, the GR date is evaluated with ATD and ATA dates to calculate the final GR date for a delivery line item, as described above in connection with FIGS. 7A-7D. In one or more embodiments, the shipments table 502 has a one-to-zero or more relationship with the customs brokerage monthly data table 704 (described above in connection with FIG. 7) and a one-to-zero or more relationship to a freight forwarder monthly data table 702 (described above in connection with FIG. 7). In one or more embodiments, the customs brokerage monthly data table 902 and the freight forwarder monthly data table 904 have one-to-zero or more relationships with a logistics events table 906. In one or more embodiments, the shipments table 502 has a one-to-zero or more relationship with a shipment events table 806 (described above in connection with FIG. 8) and a one-to-zero or more relationship with an EDI events priority calculation table 910. In one or more embodiments, the EDI events priority calculation table 910 has a one-to-zero or more relationship with a delivery dates table 912. In one or more embodiments, the GR date table 604 has a one-to-zero or more relationship with the delivery dates table 912.

In one or more embodiments, the logistics events table 906 includes an External Handling Unit Identifier field (foreign key), an EDI Events field, a Freight Forwarder Events field, and a Custom Brokerage Events field.

In one or more embodiments, the EDI events priority calculation table 910 includes an External Handling Unit Identifier field (foreign key), a Minimum ATD Date field, a Maximum ATA Date field, and BOL field, and a Maximum Customs Depart Date field.

In one or more embodiments, the delivery dates table 912 includes an External Handling Unit Identifier field (foreign key), a Delivery Key field, and a GR Date field.

Figure 10:
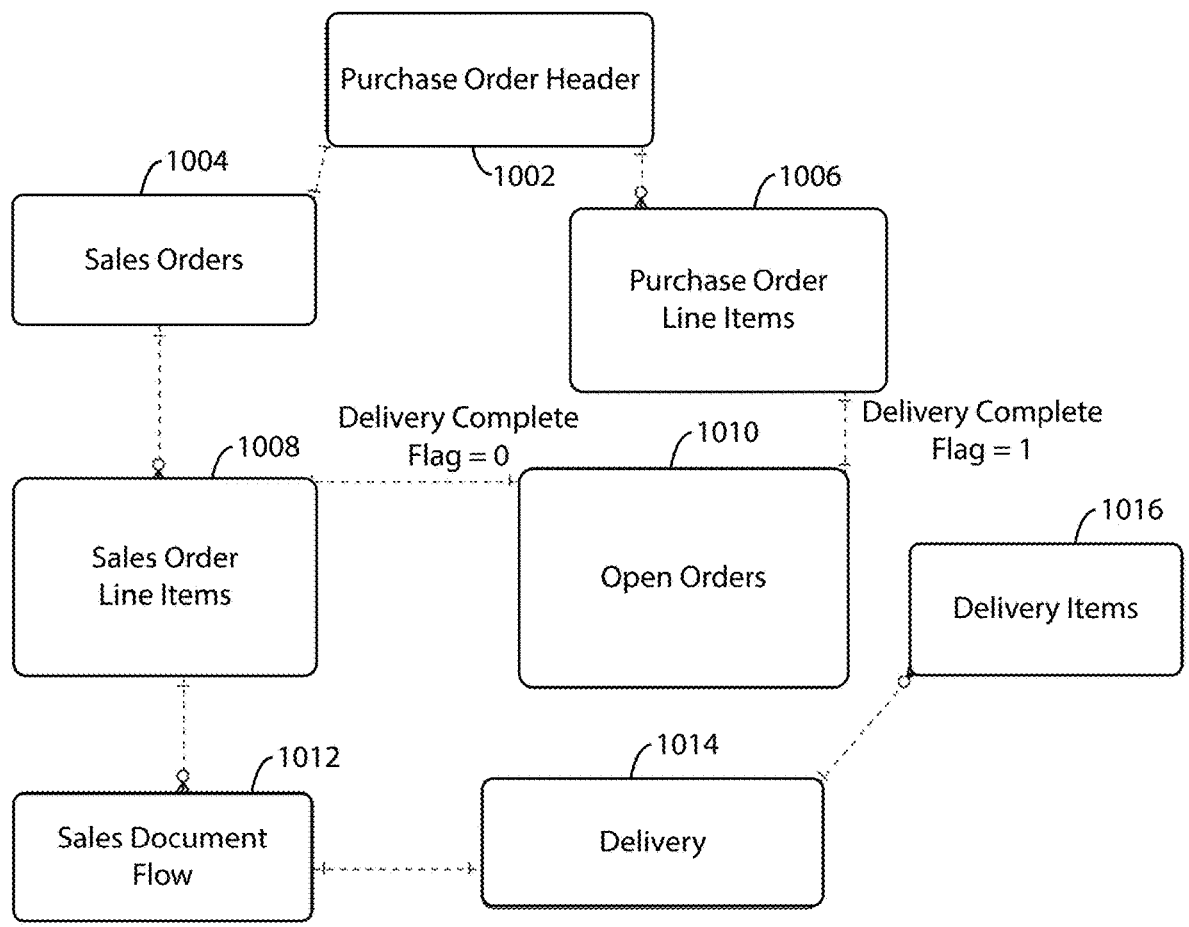

In one or more embodiments, illustrated in FIG. 10, an open order report has been created to capture all open orders, including vendor purchase orders and vendor redeployments, where shipments have not been created or will not be created. In one or more embodiments, this data is concatenated to strategic shipment data for the visibility data model 214. In one or more embodiments, for direct sales orders (shipments sent directly to customers) where purchase orders are not GRed in SAP®, data is removed from the visibility report 90 days after PGI. In one or more embodiments, a delivery complete flag from purchase order data is used to remove the old complete purchase orders. In one or more embodiments, the GR date calculation for the vendor purchase order is performed in the visibility data model 218. In one or more embodiments, tracking events for field deployments and vendor purchase orders are entered via the additional events portal 112.

In one or more embodiments, a purchase order header table 1002 has a one to one relationship with a sales order table 1004 and a one-to-zero or more relationship with a purchase order line items table 1006. In one or more embodiments, the sales order table 1004 has a one-to-zero or more relationship with a sales order line items table 1008. In one or more embodiments, the purchase order line items table 1006 has a one-to-one relationship with an open orders table 1010. In one or more embodiments, the sales order line items table 1008 has a one-to-one relationship with the open orders table 1010. In one or more embodiments, the sales order line items table 1008 has a one-to-zero or more relationship with a sales document flow table 1012. In one or more embodiments, a delivery table 1014 has a one-to-zero or more relationship with a delivery items table 1016.

In one or more embodiments, the purchase order header table 1002 has a Purchase Order Number field (foreign key), an Origin Vendor field, and a Purchase Order Type Code field.

In one or more embodiments, the sales order table 1004 includes a Sales Order Number field (primary key) and an SO Type field.

In one or more embodiments, the purchase order line items table 1006 includes a Purchase Order Number field (primary key), a Purchase Order Line Item field (foreign key), a Material Number field, an Item Quantity field, a Profit Center field, and a Delivery Complete Flag field.

In one or more embodiments, the sales order line items table 1008 includes a Sales Order Number field (primary key), a Sales Order Line Item field (foreign key), a Profit Center field, a Material Number field, an Origin Vendor field, an Item Quantity field, and a Delivery Complete Flag field.

In one or more embodiments, the open orders table 1010 includes a Sales Order Number field (foreign key), a Purchase Order Number field (foreign key), a Delivery Number field, a Ship to Partner field, an Origin Vendor field, a PO Type field, a Delivery Complete Flag field, and an External Handling Unit Identifier field.

In one or more embodiments, the sales document flow table 1012 includes a Sales Order Number field (foreign key), a Sales Order Item Number field, and a Delivery Number field (primary key).

In one or more embodiments, the delivery table 1014 includes a Delivery Number field (primary key), a Column field, a Sales Document Flow Sales Order Number field (foreign key) and a Sales Document Flow Delivery Number field (foreign key).

In one or more embodiments, the delivery items table 1016 includes a Delivery Number field (foreign key), a Delivery Item field, and a Delivery Quantity field.

Figure 11:
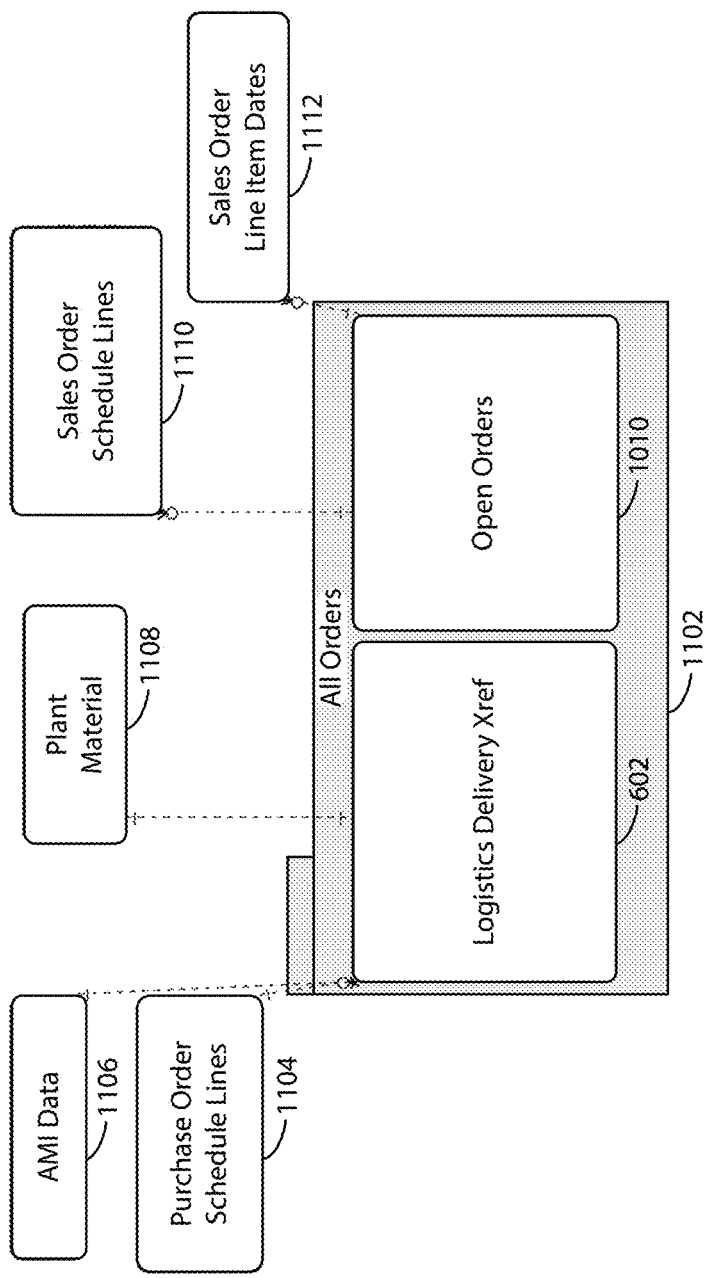

In one or more embodiments, illustrated in FIG. 11, all orders and plant materials tables are joined to produce the material PSL for manufacturing orders. In one or more embodiments, an all orders table 1102 is a concatenation of the logistics delivery cross-reference table 602 (discussed above in connection with FIG. 6) and the open orders table 1010 (discussed above in connection with FIG. 10). In one or more embodiments, a purchase order schedule lines table 1104 has a one-to-zero or more relationship with the all orders table 1102. In one or more embodiments, an AMI data table 1106 has a one-to-zero or more relationship with the all orders table 1102. In one or more embodiments, a Plant material table 1108 has a one-to-one relationship with the all orders table 1102. In one or more embodiments, the all orders table 1102 has a one-to-zero or more relationship with a sales order schedule lines table 1110. In one or more embodiments, the all orders table 1102 has a one-to-zero or more relationship with a sales order line items date table 1112.

In one or more embodiments, the purchase order schedule lines table 1104 includes a Purchase Order Item Key field (primary key), an Original First Date field, a PO Confirmed Quantity field, and a PO Confirmed Onsite Date field.

In one or more embodiments, the AMI data table 1106 includes a Delivery Number field (primary key) and an AMI Document Number field.

In one or more embodiments, the plant material table 1108 includes a Plant Material Key field, a Profit Center field, and a PSL field.

In one or more embodiments, the sales order schedule lines table 1110 includes a Sales Order Number field (foreign key), a Sales Order Item Number field, a Confirmed Onsite Data field, and a Confirmed Quantity field.

In one or more embodiments, the sales order line item dates table 1112 includes a Sales Order Item Key field (foreign key) and a First Confirmed Date field.

Figure 12:
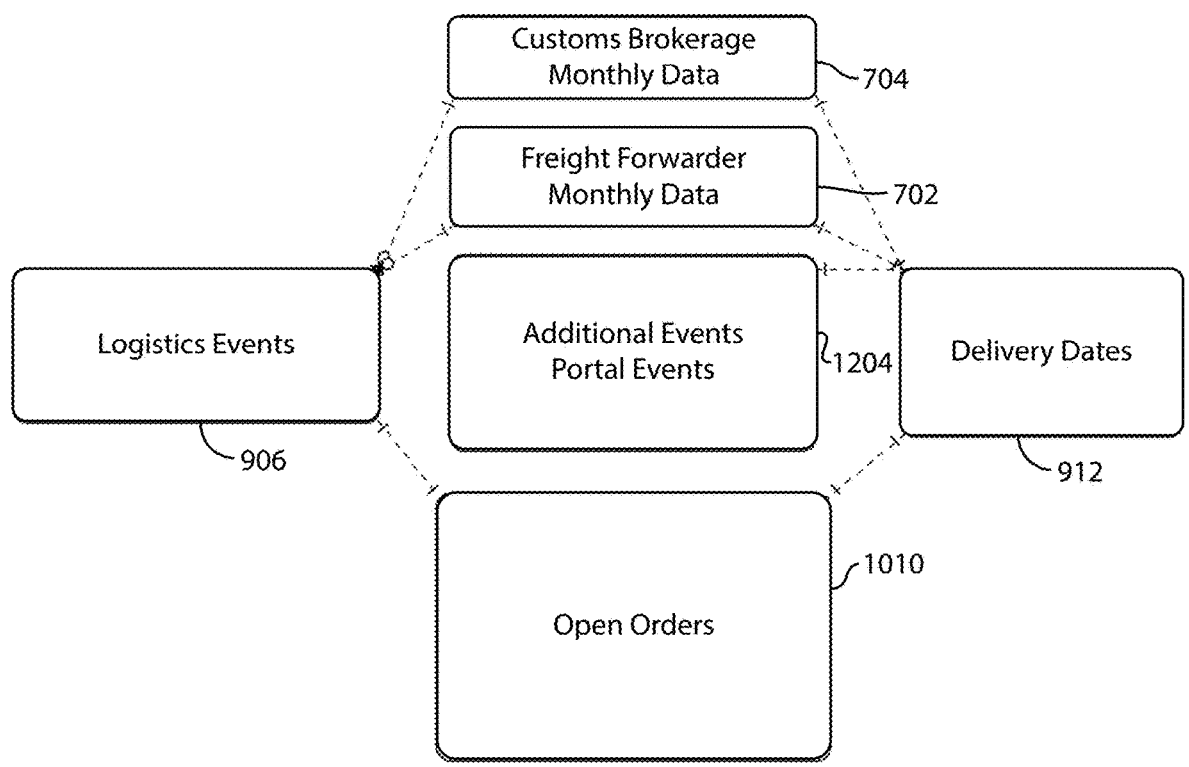

In one or more embodiments, illustrated FIG. 12, data from the Additional Events Portal 112 along with freight forwarder and customs broker reports is added to the open orders table 1010 where EDI data is not received. In one or more embodiments, the priority of events is as follows: EDI>freight forwarder monthly data>AEP data. In one or more embodiments, a reference key is created in the logistics events table 906 for reasons that are discussed below in connection with FIG. 13.

In one or more embodiments, the delivery dates table 912 (discussed above in connection with FIG. 9) has a one-to-one relationship with the customs brokerage monthly data table 704 (discussed above in connection with FIG. 7), the freight forwarder monthly data table 702 (discussed above in connection with FIG. 6), an additional events portal events table 1204, and the open order table 1010 (discussed above in connection with FIG. 10). The open orders table 1010 has a one-to-one relationship with the logistics events table 906 (discussed above in connection with FIG. 9). The customs brokerage monthly data table 704 and the freight forwarder monthly data table 702 have a one-to-zero or more relationship with the logistics events table 906.

In one or more embodiments the additional events portal events table 1204 includes a Reference Number field (primary key), an ATD Date field, an ATA Date field, a Depart Customs Date field, a BOL field, and an Event Type field.

Figure 13:
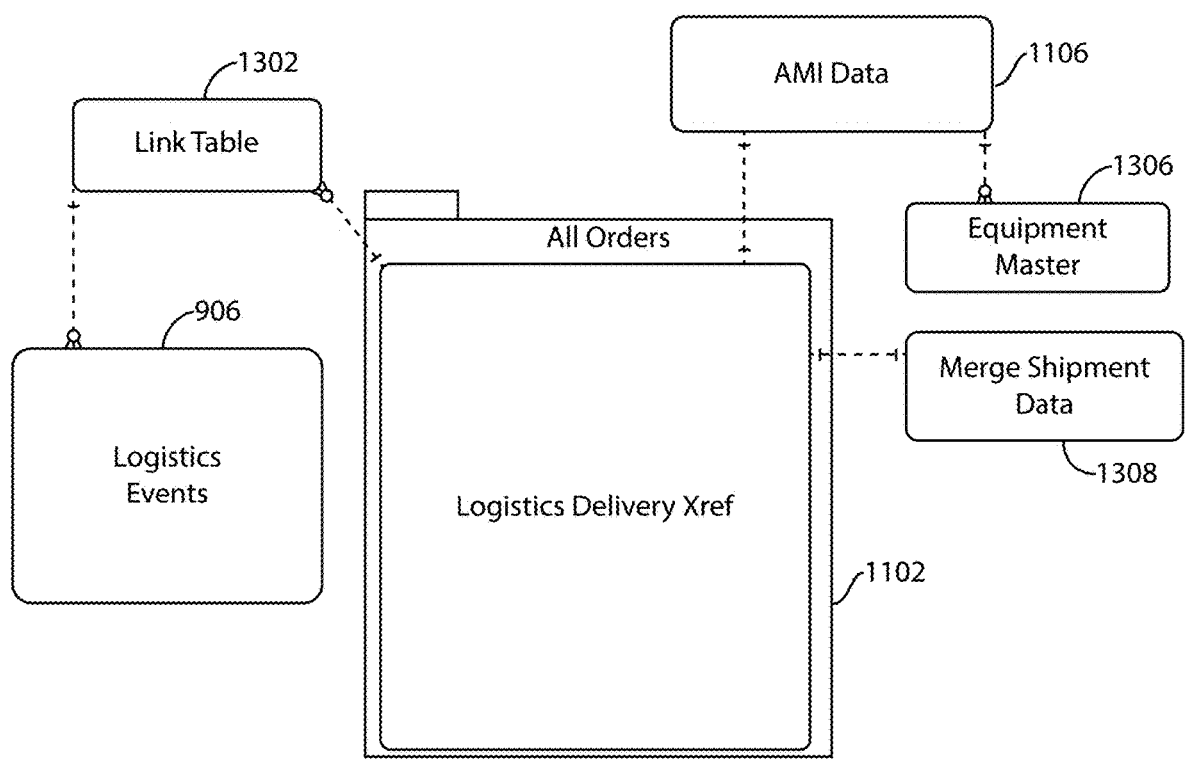

In one or more embodiments, illustrated FIG. 13, the all orders table 1102 (discussed above in connection with FIG.

11) has a one-to-zero or more relationship with a link table 1302. The link table 1302 has a one-to-zero or more relationship with the logistics events table 906 (discussed above in connection with FIG. 9). The all orders table 1102 has a one to one relationship with the AMI data table 1106. The AMI data table 1106 (discussed above in connection with FIG. 11) has a one-to-zero or more relationship with an equipment master table 1306. The all orders table 1102 has a one-to-one relationship with the merge shipment data table 1308.

In one or more embodiments, the link table 1302 has an Order Key field (foreign key) and a Reference Number field (foreign key). In one or more embodiments, the link table 1302 is used to avoid duplicate/redundant information in all order table 1102 since logistics events are received from multiple sources at multiple levels (handling unit, shipment, PO item, delivery, and invoice). In order to display events at each level, a lowest level key was made to join Events data to All Orders data.

In one or more embodiments, the equipment master table 1306 has an Equipment Number field (foreign key) and an Equipment Description field.

In one or more embodiments, the merge shipment data table 1308 has a Shipment Number field and a Merge Shipment Number field.

Visibility Presentation Application

In one or more embodiments, the visibility presentation application (i.e., the Supply Chain Visibility application) 220 improves and strengthens the supply chain process by making open order information readily available to all stakeholders; enabling improved communications, better planning, exception management; and allowing proactive business decisions to ensure on-time deliveries. In one or more embodiments, the visibility presentation algorithm 220 allows users to track deliveries from a manufacturer or vendor to a port. In one or more embodiments, the visibility presentation algorithm 220 also provides the ability to track multi-leg movements that require air, ocean, truck, and/or rail transportation modes. In one or more embodiments, the visibility presentation algorithm 220 provides the ability to track goods as they travel through customs in different countries.

In one or more embodiments, the visibility presentation application 220 provides a tool by which the performance of freight forwarders, customs brokers, and other such entities can be analyzed. For example, referring to FIG. 1, if a shipment from the enterprise 114 by freight forwarders 142 and 150 arrives at the final destination 154 before a shipment carried by freight forwarder 138, that information can be useful in judging the performance of the freight forwarders 142, 150, 154, and of the port agent 146. For example, such analysis may lead to greater use of one freight forwarder over another or of a decision to use a particular freight forwarder only in certain ways, such as for overland routes versus air-based routes, rail-based routes, charter routes, or sea-based routes. Thus, the visibility presentation application 220 provides a tool by which an enterprise logistics department can analyze and improve its performance.

Figure 14:
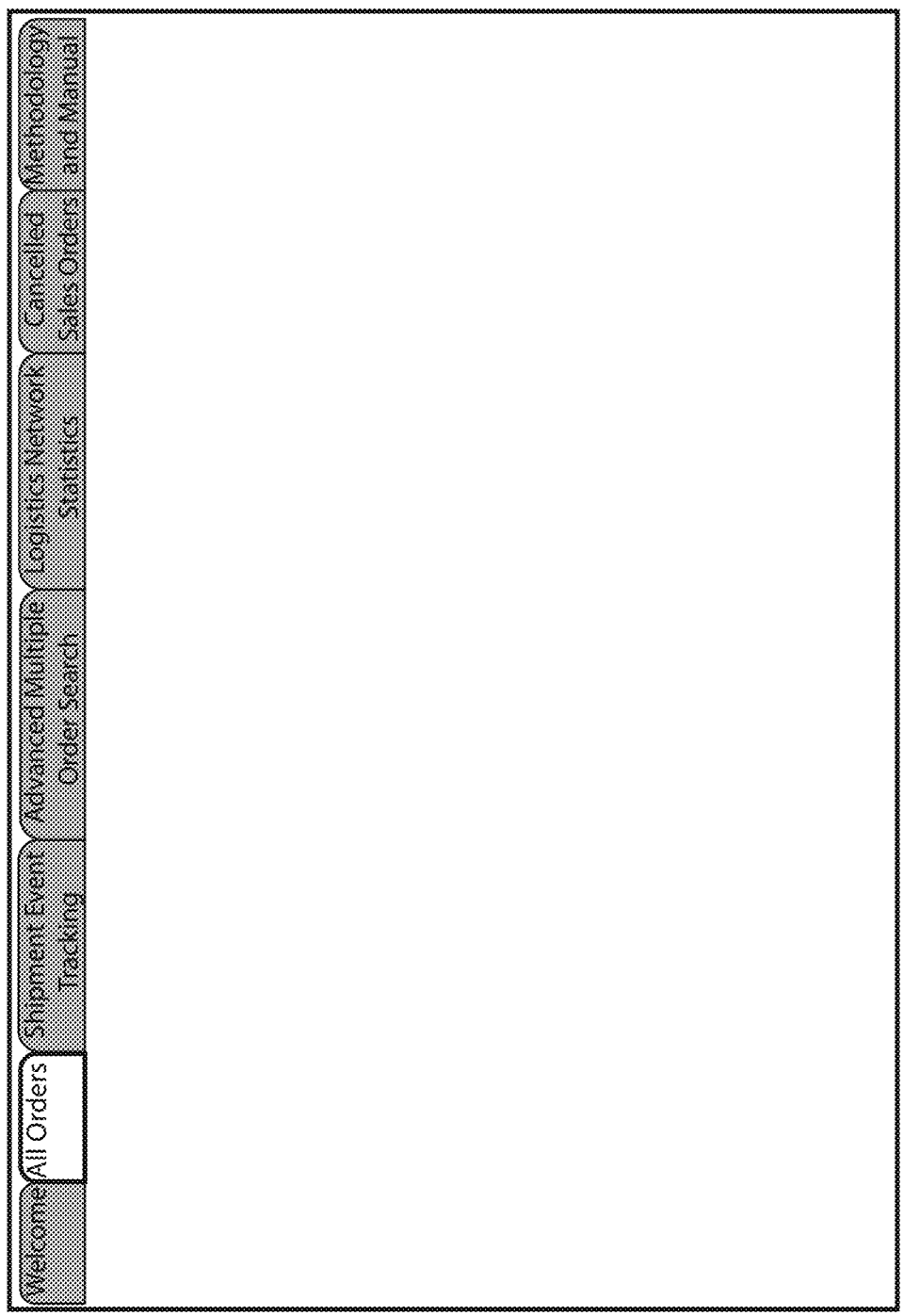
FIG. 14 is a screen shot from a visibility presentation application.

In one or more embodiments, the visibility presentation application 220 has the following functionality, illustrated by the tabs on the screen shot shown in FIG. 14:

All Orders: Complete order summary with logistics milestones and expected arrival date;

Shipment Event Tracking: Detailed tracking page for individual Orders;

Multiple Order Search: Order summary for requested reference numbers;

Logistics Network Statistics: Analysis on vendors by country and volume;

Cancelled Sales Orders: Details of open purchase orders with cancelled sales orders; and Methodology and Manual: training manual and documentation.

Search Criteria

In one or more embodiments, as shown in FIG. 15, orders can be searched by:

origin, including plant and country;

destination, including ship to country, ship to party, sold to party, and sold to country;

mode of transport, service level, ordering PSL, sub PSL, material PSL;

movement, type including origin type (manufacturing, vendor, field redeployments) and destination type (manufacturing, field and customers).

GR Yes/No—Helps users to select open or closed orders

AMI Yes/No—Assets selection

Delivery Created—User can select orders for which are delivery has been created

Capital PO—High value Capital PO can be searched easily

In one or more embodiments, users can also directly search orders by reference numbers (PO number, Sales Order number, Delivery number, Shipment number, Material Number, AMI document number or Billing Document/Invoice Number).

All Orders

In one or more embodiments, selecting the "All Orders" tab produces a material level detail with key logistics dates on summary page, illustrated in FIG. 16 (column names only), which allows users to quickly view their orders with minimum effort and selections. In one or more embodiments, this table has complete details from Purchase Orders, Sales Orders, Material information, Shipment, Delivery, Invoice, Quantity, Confirmed Quantity, Expected Delivery Date, Logistics Key dates, GR date, PSL, Mode, Origin and Destination information.

All Orders (Logistics Summary)

In one or more embodiments, an All Orders (Logistics Summary) screen, illustrated in FIG. 17 (column names only) provides an order summary at shipment/invoice level without duplicating data at material level, which provides a quick recap of open orders (not goods receipt) for logistics personnel to enter events on Additional Events Portal. In one or more embodiments, the screen also provides management a quick recap of open and in transit shipments by BOL, Origin, Destination and PSL.

Shipment Tracking

Figure 18:
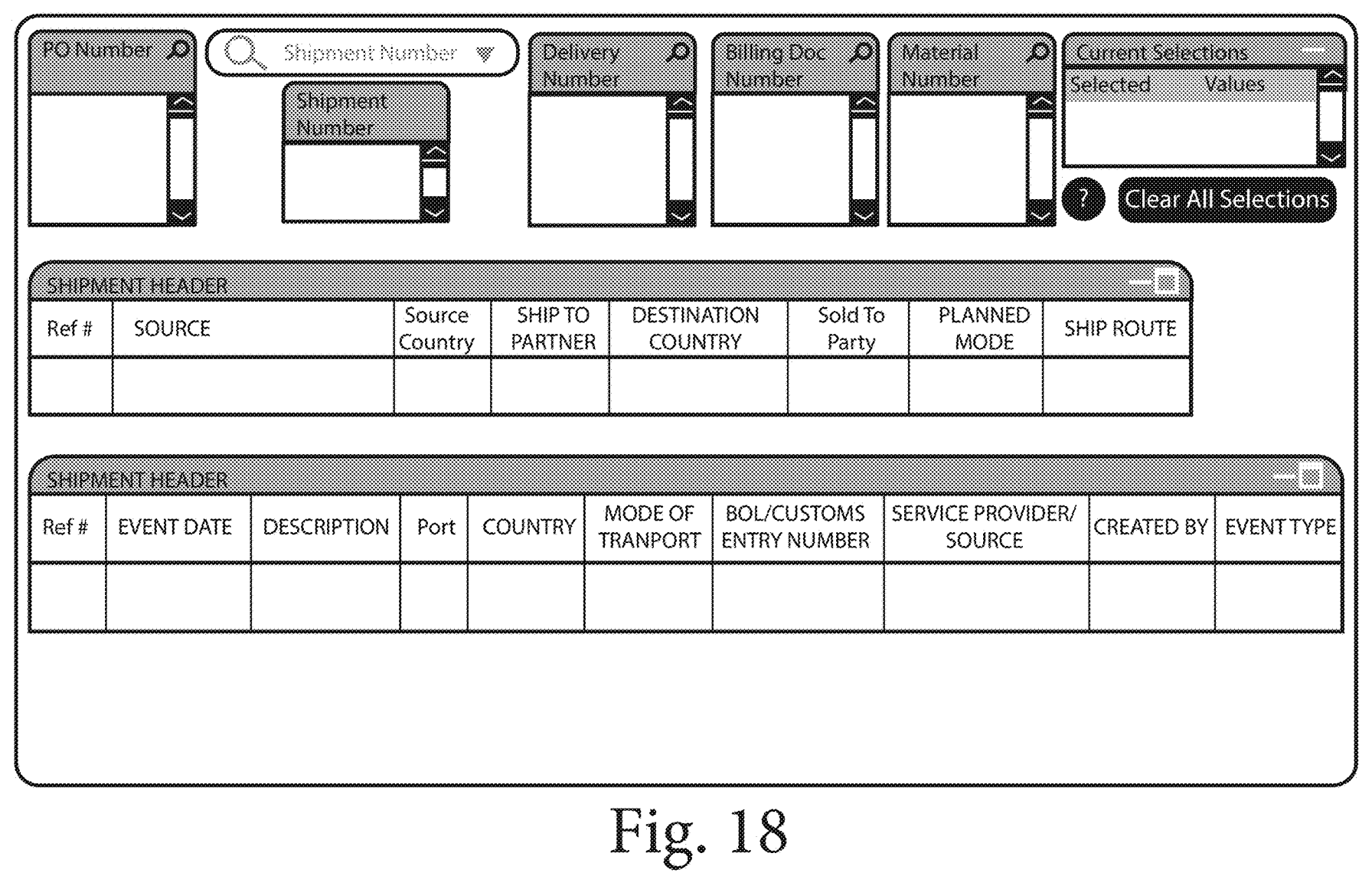

In one or more embodiments, the Shipment Tracking page of the tool, illustrated in FIG. 18, provides detail tracking of each order from delivery create to GR. In one or more embodiments, the user can search by any order reference number. In one or more embodiments, this functionality allows ease of access to logistics and SAP® dates from multiple sources at one location. In one or more embodiments, the user can find the complete tracking details with all the scans including but not limited to crossdock received/loaded scans, departed Origin facility, Freight forwarder events from multiple sources, SAP events and also event at Purchase Order (GR date).

In one or more embodiments, any order can be tracked using any SAP® reference number or even external reference BOL and Customs Entry Number. In one or more embodiments, events shown are not duplicated at each box level while logic has been built into the data model to consolidate events based on the highest reference number.

Historical Visibility Tool

In one or more embodiments, the Supply Chain Visibility Tool drops all orders that have GR dates greater than 30 days from current date. In one or more embodiments, these closed orders can be viewed in a Historical Visibility Report which uses the same concept of Supply Chain Visibility Data model but reduced to Closed Orders. In one or more embodiments, the Historical report can be accessed by users from Supply Chain Visibility Tool by click of the "Historical Data" button shown on FIG. 15, which transfers current selections from existing report to the new report. In one or more embodiments, this functionality uses the QLIK-VIEW® "document chaining" feature. The presentation layer and selection criteria on Historical Visibility Report is same as Supply Chain Visibility Tool, hence users find it easy to extract and analyze closed order data.

Logistics Network Statistics

Figure 19:
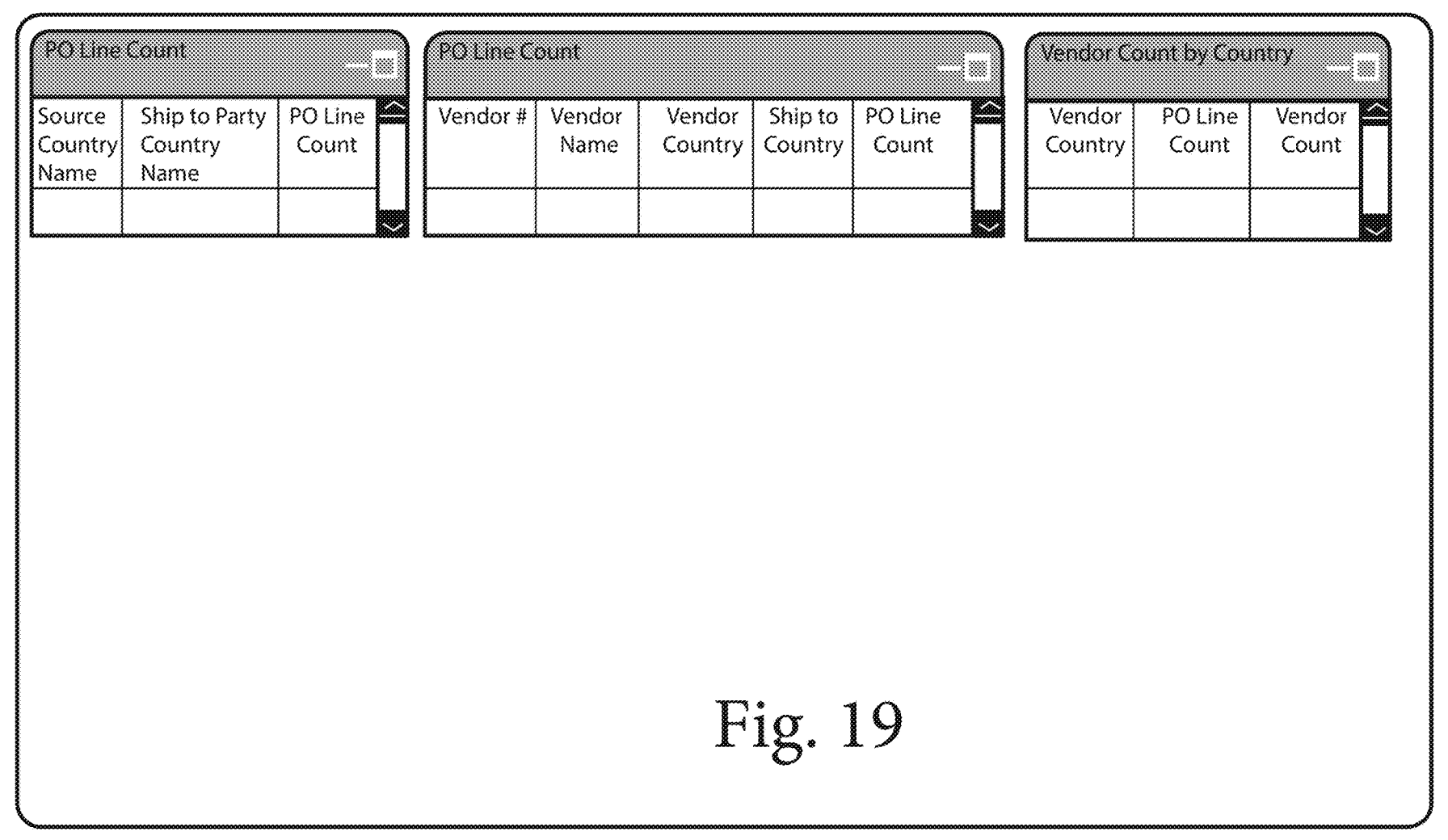

In one or more embodiments, a logistics network statistics tool, illustrated in FIG. 19, provides analysis on vendor ships and volume of orders by country.

Sales Order Cancellation Statistics

Figure 20:
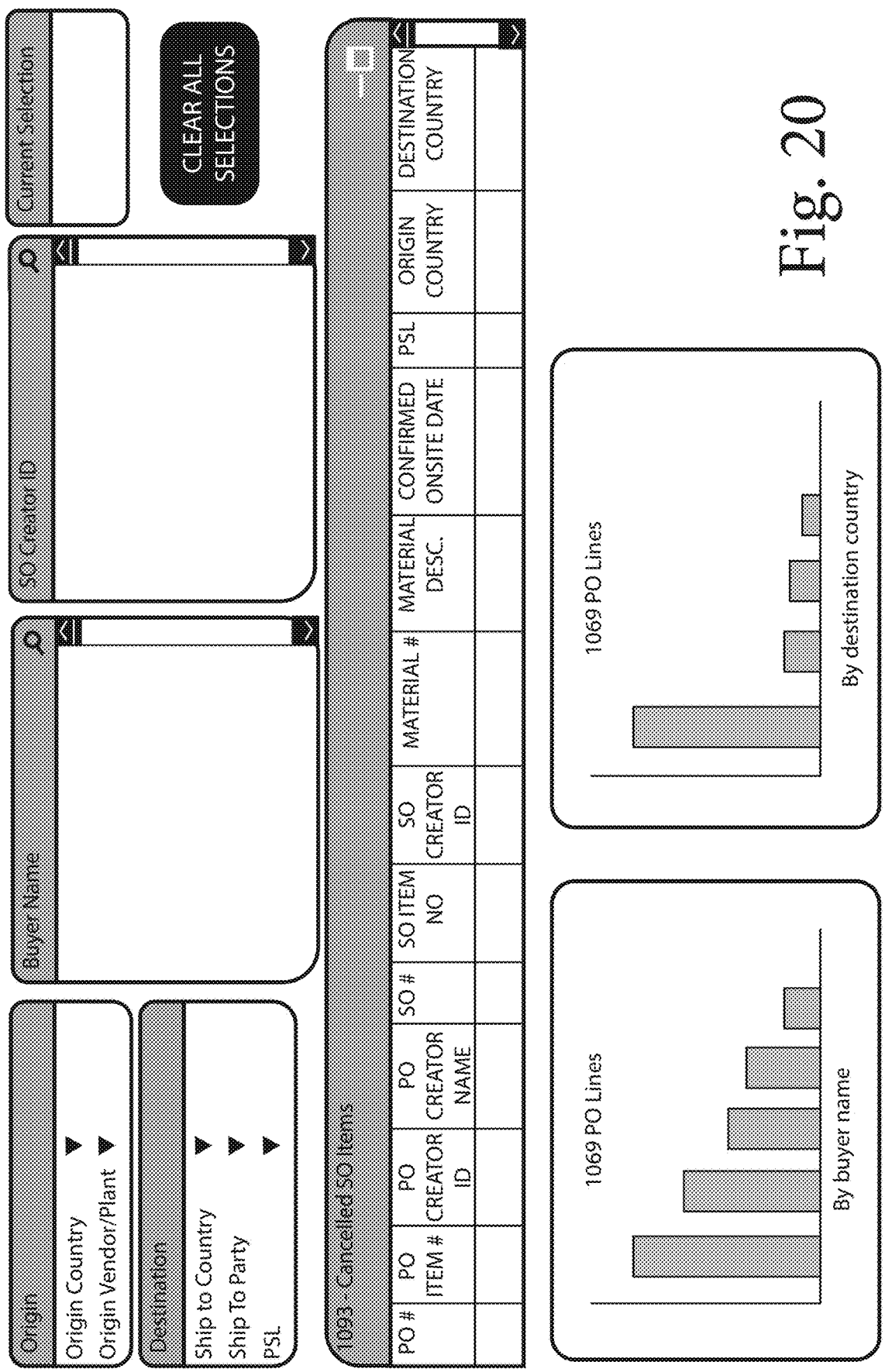
FIG. 20 is a screen shot of a sales order cancellation notification tool.

In one or more embodiments, a Sales Order Cancellation notification tool, illustrated in FIG. 20, provides visibility to cancelled sales orders where purchase orders are not marked deleted in SAP®. Procurement and materials users can identify the issue with open POs where sales orders have been cancelled and can take necessary action.

Multiple Order Search

In one or more embodiments, an Advanced Multiple Order Search is a free form search template (not shown) designed for the experienced users who feel at ease using extended functionality to track a number of POs, Invoices, Shipments, Deliveries or Materials. Once the user has entered or copied the known selections, i.e. Purchase Orders, separated by commas or blanks, the system provides details about those selections, such as the details described above in connection with the discussion of the "All Orders" tab in FIG. 16.

In one or more embodiments, material lead time is used to check for expected events at each key location. In order to deliver product on expected delivery date, it is possible to compute Post Goods Issued by manufacturing location or vendor using total lead time the date when the order should be.

In one or more embodiments, stop light indicators by PO line/shipment based on expected delivery logic enable proactive exception management up-stream. In one or more embodiments, critical business decision could be made in time to either switch the mode of transport or to look for an alternate vendor to avoid late deliveries to customers.

In one or more embodiments, email notification is provided with order tracking. In one or more embodiments, complete tracking details are provided to customers through automatic notification of key events. In one or more embodiments, integrated SAP® data with freight forwarder or courier events are sent on request by system.

In one or more embodiments, multi-leg tracking notification are added to help cross docks and customers get pre-alerts for expected arrival at each shipment leg.

In one aspect, a processor calculates the goods received (GR) date for a purchase order line item (POLI) based on multiple shipments tied to the POLI and multiple GRs tied to the POLI entered at a field location.

In one aspect, multiple deliveries tied to a purchase order line item (POLI) are identified. Each of the multiple deliveries has a delivery quantity and a post goods issue (PGI) date. Each PGI date is the date goods for the respective delivery were physically moved from a warehouse or a plant. The PGI dates have an order. Multiple shipments each tied to a delivery are identified. Each of the multiple shipments has a shipment quantity. Multiple goods received (GR) events for the multiple deliveries tied to the POLI are identified. Each of the multiple GR events has a GR quantity and a GR date. The GR dates have an order. A required quantity for the POLI is identified. A processor calculates a GR_Date_1 array by: matching the delivery quantities tied to the POLI to the GR quantities of the multiple GR events tied to the POLI. The matching is ambiguous because at least some of the delivery quantities tied to the POLI are equal and at least some of the GR quantities tied to the POLI are equal. The ambiguity is resolved by giving preference to aligning the order of the PGI dates to the order of GR dates. For each delivery, the delivery quantity, PGI date for the delivery quantity, GR quantity, and GR date for each match is saved in the GR_Date_1 array. The processor calculates a GR_Date_2 array by summing the delivery quantities of deliveries tied to the same shipment, matching the summed delivery quantities to the GR quantities, and for each delivery, saving the delivery quantity, PGI date for the delivery quantity, GR quantity, and GR date in the GR_Date_2 array. The processor calculates a GR_Date_3 array by summing the GR quantities of a group of GR events so that the sum matches a delivery quantity of one of the multiple deliveries, determining a maximum of the GR dates from the group of GR events and saving it as a maximum_GR_date_3, changing the GR dates of the GR events in the group to the maximum_GR_date_3, and, for each delivery, saving the delivery quantity, PGI date for the delivery quantity, summed GR quantity, and changed GR date in the GR_Date_3 array. The processor calculates a GR_Date_4 array by summing the GR quantities of the multiple GR events to produce summed_GR_quantities, determining that the summed_GR_quantities equals the required quantity for the POLI, determining a maximum of the GR dates from the multiple GR events and saving it as maximum_GR_date_4, changing the GR dates of the multiple GR events to the maximum_GR_date_4, and for each delivery, saving the delivery quantity, PGI date for the delivery quantity, summed GR quantity, and changed GR date in the GR_Date_4 array. For each shipment, an ATA_Date is determined as the actual time of arrival of the shipment. The following condition is determined not to be true for at least one of the deliveries: (GR date from GR_Date_1>ATA_Date and GR date from GR_Date_1>PGI_Date). The following condition is determined not to be true for at least one of the deliveries: (GR date from GR_Date_2>ATA_Date and GR date from GR_Date_2>PGI_Date). The following condition is determined not to be true for at least one of the deliveries: (GR date from GR_Date_3>ATA_Date and GR date from GR_Date_3>PGI_Date). The following condition is determined not to be true for at least one of the deliveries: (GR date from GR_Date_4>ATA_Date and GR date from GR_Date_4>PGI_Date). It is determined, as a result, that the purchase order is still open.

In one aspect, multiple deliveries tied to a purchase order line item (POLI) are identified. Each of the multiple deliveries has a delivery quantity and post goods issue (PGI) date. Each PGI date is the date goods for the respective delivery were physically moved from a warehouse or a plant. The PGI dates have an order. Multiple shipments each tied to a delivery are identified. Each of the multiple shipments has a shipment quantity. Multiple goods received (GR) events are identified for the multiple deliveries tied to the POLI. Each of the multiple GR events has a GR quantity and a GR date. The GR dates have an order. A required quantity for the POLI is identified. A processor calculates a GR_Date_1 array by matching the delivery quantities tied to the POLI to the GR quantities of the multiple GR events tied to the POLI. The matching is ambiguous because at least some of the delivery quantities tied to the POLI are equal and at least some of the GR quantities tied to the POLI are equal. The ambiguity is resolved by giving preference to aligning the order of the PGI dates to the order of GR dates. For each delivery, the delivery quantity, PGI date for the delivery quantity, GR quantity, and GR date for each match are saved in the GR_Date_1 array. The processor calculates a GR_Date_2 array by summing the delivery quantities of deliveries tied to the same shipment, matching the summed delivery quantities to the GR quantities, and, for each delivery, saving the delivery quantity, PGI date for the delivery quantity, GR quantity, and GR date in the GR_Date_2 array. The processor calculates a GR_Date_3 array by summing the GR quantities of a group of GR events so that the sum matches a delivery quantity of one of the multiple deliveries, determining a maximum of the GR dates from the group of GR events and saving it as a maximum_GR_date_3, changing the GR dates of the GR events in the group to the maximum_GR_date_3, and for each delivery, saving the delivery quantity, PGI date for the delivery quantity, summed GR quantity, and changed GR date in the GR_Date_3 array. The processor calculates a GR_Date_4 array by summing the GR quantities of the multiple GR events to produce summed_GR_quantities, determining that the summed GR quantities equals the required quantity for the POLI, determining a maximum of the GR dates from the multiple GR events and saving it as maximum_GR_date_4, changing the GR dates of the multiple GR events to the maximum_GR_date_4, for each delivery, saving the delivery quantity, PGI date for the delivery quantity, summed GR quantity, and changed GR date in the GR_Date_4 array, and, for each shipment, determining an ATA_date as the actual time of arrival of the shipment. The following GRDATE1 condition is determined to be true for at least one of the deliveries: (GR date from GR_Date_1>ATA_Date and GR date from GR_Date_1>PGI_Date). Setting the GR date for each of the at least one deliveries for which the GRDATE1 condition is true to the respective GR date for the delivery in the GR_Date_1 array.

In one aspect, multiple delivery items tied to a purchase order line item (POLI) are identified. Each of the multiple delivery items has a delivery item quantity and post goods issue (PGI) date. Each PGI date is the date goods for the respective delivery item were physically moved from a warehouse or a plant. The PGI dates have an order. Multiple shipments are identified. Each of the multiple shipments has a shipment quantity. Each shipment is tied to a delivery. Each delivery is tied to a delivery item. At least one of the deliveries is tied to a plurality of delivery items. Multiple goods received (GR) events for the multiple delivery items tied to the POLI are identified. Each of the multiple GR events has a GR quantity and a GR date. The GR dates have an order. A required quantity for the POLI is identified. A processor calculates a GR_Date_1 array by matching the delivery item quantities tied to the POLI to the GR quantities of the multiple GR events tied to the POLI. The matching is ambiguous because at least some of the delivery item quantities tied to the POLI are equal and at least some of the GR quantities tied to the POLI are equal. The ambiguity is resolved by giving preference to aligning the order of the PGI dates to the order of GR dates. For each delivery item, the delivery item quantity, PGI date for the delivery item quantity, GR quantity, and GR date for each match is saved in the GR_Date_1 array. The processor calculates a GR_Date_2 array by summing the delivery item quantities of delivery items tied to the same shipment, matching the summed delivery item quantities to the GR quantities, and for each delivery, saving the summed delivery item quantities, PGI date for the delivery quantity, GR quantity, and GR date in the GR_Date_2 array. The processor calculates a GR_Date_3 array by summing the GR quantities of a group of GR events so that the sum matches a delivery item quantity of one of the multiple deliveries, determining a maximum of the GR dates from the group of GR events and saving it as a maximum_GR_date_3, changing the GR dates of the GR events in the group to the maximum_GR_date_3, and for each delivery item, saving the delivery item quantity, PGI date for the delivery item quantity, summed GR quantity, and changed GR date in the GR_Date_3 array. The processor calculates a GR_Date_4 array by summing the GR quantities of the multiple GR events to produce summed_GR_quantities, determining that the summed_GR_quantities equals the required quantity for the POLI, determining a maximum of the GR dates from the multiple GR events and saving it as maximum_GR_date_4, changing the GR dates of the multiple GR events to the maximum_GR_date_4, for each delivery item, saving the delivery item quantity, PGI date for the delivery item quantity, summed GR quantity, and changed GR date in the GR_Date_4 array. For each shipment, an ATA_date is determined as the actual time of arrival of the shipment. The following GRDATE1 condition is determined not to be true for at least one of the delivery items: (GR date from GR_Date_1>ATA_Date and GR date from GR_Date_1>PGI_Date). The following GRDATE2 condition is determined to be true for at least one of the deliveries: (GR date from GR_Date_2>ATA_Date and GR date from GR_Date_2>PGI_Date). The GR date for each of the deliveries for which the GRDATE2 condition is true is set to the respective GR date for the delivery in the GR_Date_2 array.

In one aspect, multiple deliveries tied to a purchase order line item (POLI) are identified. Each of the multiple deliveries has a delivery quantity and post goods issue (PGI) date. Each PGI date is the date goods for the respective delivery were physically moved from a warehouse or a plant. The PGI dates have an order. Multiple shipments are identified each tied to a delivery. Each of the multiple shipments has a shipment quantity. Multiple goods received (GR) events for the multiple deliveries tied to the POLI are identified. Each of the multiple GR events has a GR quantity and a GR date. The GR dates have an order. A required quantity for the POLI is identified. A processor calculates a GR_Date_1 array by matching the delivery quantities tied to the POLI to the GR quantities of the multiple GR events tied to the POLI. There the matching is ambiguous because at least some of the delivery quantities tied to the POLI are equal and at least some of the GR quantities tied to the POLI are equal. The ambiguity is resolved by giving preference to aligning the order of the PGI dates to the order of GR dates. For each delivery, delivery quantity, PGI date for the delivery quantity, GR quantity, and GR date for each match in saved in the GR_Date_1 array. The processor calculates a GR_Date_2 array by summing the delivery quantities of deliveries tied to the same shipment, matching the summed delivery quantities to the GR quantities, and for each delivery, saving the delivery quantity, PGI date for the delivery quantity, GR quantity, and GR date in the GR_Date_2 array. The processor calculates a GR_Date_3 array by summing the GR quantities of a group of GR events so that the sum matches a delivery quantity of one of the multiple deliveries, determining a maximum of the GR dates from the group of GR events and saving it as a maximum_GR_date_3, changing the GR dates of the GR events in the group to the maximum_GR_date_3, and for each delivery, saving the delivery quantity, PGI date for the delivery quantity, summed GR quantity, and changed GR date in the GR_Date_3 array. The processor calculates a GR_Date_4 array by summing the GR quantities of the multiple GR events to produce summed_GR_quantities, determining that the summed_GR_quantities equals the required quantity for the POLI, determining a maximum of the GR dates from the multiple GR events and saving it as maximum_GR_date_4, changing the GR dates of the multiple GR events to the maximum_GR_date_4; for each delivery, saving the delivery quantity, PGI date for the delivery quantity, summed GR quantity, and changed GR date in the GR_Date_4 array. For each shipment, an ATA_date is determined as the actual time of arrival of the shipment. The following GRDATE1 condition is determined not to be true for at least one of the deliveries: (GR date from GR_Date_1>ATA_Date and GR date from GR_Date_1>PGI_Date). The following GRDATE2 condition is determined not to be true for at least one of the deliveries: (GR date from GR_Date_2>ATA_Date and GR date from GR_Date_2>PGI_Date). The following GRDATE3 condition is determined to be true for at least one of the deliveries: (GR date from GR_Date_3>ATA_Date and GR date from GR_Date_3>PGI_Date). The GR date for each of the at least one deliveries for which the GRDATE3 condition is true is set to the respective GR date for the delivery in the GR_Date_3 array.

In one aspect, multiple deliveries tied to a purchase order line item (POLI) are identified. Each of the multiple deliveries has a delivery quantity and post goods issue (PGI) date. Each PGI date is the date goods for the respective delivery were physically moved from a warehouse or a plant. The PGI dates have an order. Multiple shipments each tied to a delivery are identified. Each of the multiple shipments has a shipment quantity. Multiple goods received (GR) events for the multiple deliveries tied to the POLI are identified. Each of the multiple GR events has a GR quantity and a GR date. The GR dates have an order. A required quantity for the POLI is identified. A processor calculates a GR_Date_1 array by matching the delivery quantities tied to the POLI to the GR quantities of the multiple GR events tied to the POLI. The matching is ambiguous because at least some of the delivery quantities tied to the POLI are equal and at least some of the GR quantities tied to the POLI are equal. The ambiguity is resolved by giving preference to aligning the order of the PGI dates to the order of GR dates. For each delivery, the delivery quantity, PGI date for the delivery quantity, GR quantity, and GR date for each match is saved in the GR_Date_1 array. The processor calculates a GR_Date_2 array by summing the delivery quantities of deliveries tied to the same shipment, matching the summed delivery quantities to the GR quantities, and for each delivery, saving the delivery quantity, PGI date for the delivery quantity, GR quantity, and GR date in the GR_Date_2 array. The processor calculates a GR_Date_3 array by summing the GR quantities of a group of GR events so that the sum matches a delivery quantity of one of the multiple deliveries, determining a maximum of the GR dates from the group of GR events and saving it as a maximum_GR_date_3, changing the GR dates of the GR events in the group to the maximum_GR_date_3, and for each delivery, saving the delivery quantity, PGI date for the delivery quantity, summed GR quantity, and changed GR date in the GR_Date_3 array. The processor calculates a GR_Date_4 array by summing the GR quantities of the multiple GR events to produce summed_GR_quantities, determining that the summed_GR_quantities equals the required quantity for the POLI, determining a maximum of the GR dates from the multiple GR events and saving it as maximum_GR_date_4, changing the GR dates of the multiple GR events to the maximum_GR_date_4, and for each delivery, saving the delivery quantity, PGI date for the delivery quantity, summed GR quantity, and changed GR date in the GR_Date_4 array. For each shipment, an ATA_date is determined as the actual time of arrival of the shipment. The following GRDATE1 condition is determined not to be true for at least one of the deliveries: (GR date from GR_Date_1>ATA_Date and GR date from GR_Date_1>PGI_Date). The following GRDATE2 condition is determined not to be true for at least one of the deliveries: (GR date from GR_Date_2>ATA_Date and GR date from GR_Date_2>PGI_Date). The following GRDATE3 condition is determined not to be true for at least one of the deliveries: (GR date from GR_Date_3>ATA_Date and GR date from GR_Date_3>PGI_Date). The following GRDATE4 condition is determined to be true for at least one of the deliveries: (GR date from GR_Date_4>ATA_Date and GR date from GR_Date_4>PGI_Date). Setting the GR date for each of the at least one deliveries for which the GRDATE4 condition is true to the respective GR date for the delivery in the GR_Date_4 array.

In one aspect, a processor receives and stores logistics data about a purchase order line item (POLI). The logistics data includes a plurality of shipments. Each shipment includes deliveries tied to the purchase order line item (POLI). Each of the deliveries has a delivery quantity and a post goods issue (PGI) date. The logistics data further includes a plurality of logistics services for the plurality of shipments including deliveries tied to the POLI. One of the plurality of shipments, a multi-mode shipment, has a plurality of sequential logistics services. The logistics data further includes a plurality of deliveries tied to the POLI, wherein a processor determines a goods received (GR) quantity, and a GR date for each of the deliveries. The processor provides a display of the PGI date and the GR date for the multi-mode shipment.

Implementations of the invention may include one or more of the following. The processor receiving and storing logistics data about the POLI may include receiving data from logistics data providers selected from the group consisting of freight forwarders and customs brokers. The plurality of sequential logistics services may include a first mode of transportation operated by a first provider, the first provider transporting the multi-mode shipment from a first location to a second location, and a second mode of transportation operated by a second provider different from the first provider, the second provider transporting the multi-mode shipment from the second location to a third location. Determining the GR date for each of the deliveries may include the processor calculating the GR dates for deliveries tied to the multi-mode shipment based on the plurality of deliveries tied to the POLI. The plurality of sequential logistics services may include a service provided by a freight handling company, a service provided by a courier company, and a service provided by a logistic customs broker. The plurality of sequential logistics services may be selected from a group consisting of a service provided by a freight handling company, a service provided by a courier company, and a service provided by a logistic customs broker.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
identifying multiple deliveries tied to a purchase order line item (POLI), where each of the multiple deliveries has a delivery quantity and a post goods issue (PGI) date, each PGI date being the date goods for the respective delivery were physically moved from a warehouse or a plant, the PGI dates having an order;
identifying multiple shipments each tied to a delivery, where each of the multiple shipments has a shipment quantity;
identifying multiple goods received (GR) events for the multiple deliveries tied to the POLI, where each of the multiple GR events has a GR quantity and a GR date, and where the GR dates have an order;
identifying a required quantity for the POLI;
a processor calculating a GR_Date_1 array by:
matching the delivery quantities tied to the POLI to the GR quantities of the multiple GR events tied to the POLI,
where the matching is ambiguous because at least some of the delivery quantities tied to the POLI are equal and at least some of the GR quantities tied to the POLI are equal,
resolving the ambiguity by giving preference to aligning the order of the PGI dates to the order of GR dates,
for each delivery, saving the delivery quantity, PGI date for the delivery quantity, GR quantity, and GR date for each match in the GR_Date_1 array
the processor calculating a GR_Date_2 array by:
summing the delivery quantities of deliveries tied to the same shipment,
matching the summed delivery quantities to the GR quantities, and
for each delivery, saving the delivery quantity, PGI date for the delivery quantity, GR quantity, and GR date in the GR_Date_2 array;
the processor calculating a GR_Date_3 array by:
summing the GR quantities of a group of GR events so that the sum matches a delivery quantity of one of the multiple deliveries,
determining a maximum of the GR dates from the group of GR events and saving it as a maximum GR_date_3,
changing the GR dates of the GR events in the group to the maximum_GR_date_3, and
for each delivery, saving the delivery quantity, PGI date for the delivery quantity, summed GR quantity, and changed GR date in the GR_Date_3 array;

the processor calculating a GR_Date_4 array by:
summing the GR quantities of the multiple GR events to produce summed_GR_quantities,
determining that the summed_GR_quantities equals the required quantity for the POLI,
determining a maximum of the GR dates from the multiple GR events and saving it as maximum GR_date_4,
changing the GR dates of the multiple GR events to the maximum_GR_date_4, and
for each delivery, saving the delivery quantity, PGI date for the delivery quantity,
summed GR quantity, and changed GR date in the GR_Date_4 array;
for each shipment, determining an ATA_Date as the actual time of arrival of the shipment;
determining that the following condition is not true for at least one of the deliveries:
(GR date from GR_Date_1>ATA_Date and GR date from GR_Date_1>PGI_Date);
determining that the following condition is not true for at least one of the deliveries:
(GR date from GR_Date_2>ATA_Date and GR date from GR_Date_2>PGI_Date);
determining that the following condition is not true for at least one of the deliveries:
(GR date from GR_Date_3>ATA_Date and GR date from GR_Date_3>PGI_Date);
determining that the following condition is not true for at least one of the deliveries:
(GR date from GR_Date_4>ATA_Date and GR date from GR_Date_4>PGI_Date); and
determining, as a result, that the purchase order is still open;
analyzing using the GR_Date_1 array, the GR_Date_2 array, the GR_Date_3 array, and the GR_Date_4 array to produce an analysis of a performance of a freight forwarder involved in deliveries tied to the POLI; and
hiring the freight forwarder for additional work at least in part as a result of the analysis.

2. A method comprising:
identifying multiple deliveries tied to a purchase order line item (POLI), where each of the multiple deliveries has a delivery quantity and post goods issue (PGI) date, each PGI date being the date goods for the respective delivery were physically moved from a warehouse or a plant, the PGI dates having an order;
identifying multiple shipments each tied to a delivery, where each of the multiple shipments has a shipment quantity;
identifying multiple goods received (GR) events for the multiple deliveries tied to the POLI, where each of the multiple GR events has a GR quantity and a GR date, and where the GR dates have an order;
identifying a required quantity for the POLI;
a processor calculating a GR_Date_1 array by:
matching the delivery quantities tied to the POLI to the GR quantities of the multiple GR events tied to the POLI,
where the matching is ambiguous because at least some of the delivery quantities tied to the POLI are equal and at least some of the GR quantities tied to the POLI are equal,
resolving the ambiguity by giving preference to aligning the order of the PGI dates to the order of GR dates, for each delivery, saving the delivery quantity, PGI date for the delivery quantity, GR quantity, and GR date for each match in the GR_Date_1 array the processor calculating a GR_Date_2 array by:
  summing the delivery quantities of deliveries tied to the same shipment,
  matching the summed delivery quantities to the GR quantities, and
  for each delivery, saving the delivery quantity, PGI date for the delivery quantity, GR quantity, and GR date in the GR_Date_2 array;

the processor calculating a GR_Date_3 array by:
  summing the GR quantities of a group of GR events so that the sum matches a delivery quantity of one of the multiple deliveries,
  determining a maximum of the GR dates from the group of GR events and saving it as a maximum GR_date_3,
  changing the GR dates of the GR events in the group to the maximum_GR_date_3, and
  for each delivery, saving the delivery quantity, PGI date for the delivery quantity, summed GR quantity, and changed GR date in the GR_Date_3 array;

the processor calculating a GR_Date_4 array by:
  summing the GR quantities of the multiple GR events to produce summed_GR_quantities,
  determining that the summed_GR_quantities equals the required quantity for the POLI,
  determining a maximum of the GR dates from the multiple GR events and saving it as maximum_GR_date_4,
  changing the GR dates of the multiple GR events to the maximum_GR_date_4, and
  for each delivery, saving the delivery quantity, PGI date for the delivery quantity, summed GR quantity, and changed GR date in the GR_Date_4 array;

for each shipment, determining an ATA_date as the actual time of arrival of the shipment;

determining that the following GRDATE1 condition is true for at least one of the deliveries:
  (GR date from GR_Date_1>ATA_Date and GR date from GR_Date_1>PGI_Date); and setting the GR date for each of the at least one deliveries for which the GRDATE1 condition is true to the respective GR date for the delivery in the GR_Date_1 array;

analyzing using the GR_Date_1 array, the GR_Date_2 array, the GR_Date_3 array, and the GR_Date_4 array to produce an analysis of a performance of a freight forwarder involved in deliveries tied to the POLI; and hiring the freight forwarder for additional work at least in part as a result of the analysis.

* * * * *